United States Patent
Van Thiel

(10) Patent No.: US 11,203,332 B2
(45) Date of Patent: Dec. 21, 2021

(54) ELECTRONICALLY CONTROLLABLE BRAKE SYSTEM AND METHOD FOR CONTROLLING SAID ELECTRONICALLY CONTROLLABLE BRAKE SYSTEM

(71) Applicant: WABCO GmbH, Hannover (DE)

(72) Inventor: Julian Van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 57 days.

(21) Appl. No.: 16/495,411

(22) PCT Filed: Mar. 19, 2018

(86) PCT No.: PCT/EP2018/056855
§ 371 (c)(1),
(2) Date: Sep. 19, 2019

(87) PCT Pub. No.: WO2018/172268
PCT Pub. Date: Sep. 27, 2018

(65) Prior Publication Data
US 2020/0070795 A1 Mar. 5, 2020

(30) Foreign Application Priority Data
Mar. 21, 2017 (DE) ...................... 10 2017 002 719.6

(51) Int. Cl.
*B60T 13/58* (2006.01)
*B60T 7/12* (2006.01)
(Continued)

(52) U.S. Cl.
CPC .............. *B60T 13/588* (2013.01); *B60T 7/12* (2013.01); *B60T 8/3605* (2013.01);
(Continued)

(58) Field of Classification Search
CPC ........ B60T 13/588; B60T 7/12; B60T 13/683; B60T 2270/413; B60T 8/3605;
(Continued)

(56) References Cited

U.S. PATENT DOCUMENTS 3,999,075 A * 12/1976 Johnson ................... B60T 13/22
303/63
2002/0167219 A1* 11/2002 Kemer ................... F15B 20/001
303/7

(Continued)

FOREIGN PATENT DOCUMENTS

DE          19935979 A1      4/2001
DE          102008009043 B3  5/2009
(Continued)

OTHER PUBLICATIONS

Translation of DE 102008009043 obtained from website: https://worldwide.espacenet.com on Jun. 7, 2021.*

*Primary Examiner* — Pamela Rodriguez
(74) *Attorney, Agent, or Firm* — Leydig, Voit & Mayer, Ltd.

(57) ABSTRACT

An electronically controllable brake system for a vehicle includes at least one service brake circuit with service brakes and a service brake control module, wherein a service-brake brake pressure can be fed to the service brakes, and the service-brake control module is designed to generate a service-brake control signal as a function of a braking specification. The service-brake brake pressure can be generated as a function of the service-brake control signal and specified to the service brakes, for the implementation of the braking specification via the at least one service brake circuit, under electrical control by the service-brake control module. The electronically controllable brake system further includes a parking brake circuit with spring-loaded brakes, wherein a parking-brake brake pressure can be fed to the (Continued)

spring-loaded brakes, wherein the parking-brake brake pressure can be generated as a function of the braking specification and specified to the spring-loaded brakes.

27 Claims, 11 Drawing Sheets

(51) Int. Cl.
  *B60T 8/36* (2006.01)
  *B60T 13/38* (2006.01)
  *B60T 13/66* (2006.01)
  *B60T 13/68* (2006.01)

(52) U.S. Cl.
  CPC .......... *B60T 13/385* (2013.01); *B60T 13/662* (2013.01); *B60T 13/683* (2013.01); *B60T 2270/402* (2013.01); *B60T 2270/413* (2013.01)

(58) Field of Classification Search
  CPC ............ B60T 13/662; B60T 2270/402; B60T 13/385; B60T 7/04; B60T 7/02; B60T 13/686; B60T 13/70; B60T 13/68; B60T 13/66; B60T 13/74; B60T 7/20; B60T 13/263; B60T 8/323; B60T 8/327; B60T 8/1708
  See application file for complete search history.

(56) References Cited

U.S. PATENT DOCUMENTS

| | | | |
|---|---|---|---|
| 2004/0012249 A1* | 1/2004 | Koelzer | B60G 17/0523 303/3 |
| 2007/0170774 A1 | 7/2007 | Gerum | |
| 2011/0005874 A1 | 1/2011 | Beier et al. | |
| 2011/0144855 A1 | 6/2011 | Herges et al. | |
| 2013/0184957 A1 | 7/2013 | Herges et al. | |
| 2019/0337503 A1 | 11/2019 | Otremba | |
| 2020/0023827 A1* | 1/2020 | Van Thiel | B60T 7/04 |

FOREIGN PATENT DOCUMENTS

| | | |
|---|---|---|
| DE | 102008003379 A1 | 7/2009 |
| DE | 102010021909 A1 | 12/2011 |
| DE | 102014107399 A1 | 1/2016 |
| DE | 102015008377 A1 | 12/2016 |
| DE | 102015011296 A1 | 3/2017 |
| EP | 1122142 A1 | 8/2001 |
| EP | 2090481 B1 | 11/2013 |
| EP | 2942249 A1 | 11/2015 |
| WO | WO 2004098967 A | 11/2004 |
| WO | WO 2009152982 A2 | 12/2009 |

* cited by examiner

ELECTRONICALLY CONTROLLABLE BRAKE SYSTEM AND METHOD FOR CONTROLLING SAID ELECTRONICALLY CONTROLLABLE BRAKE SYSTEM

CROSS REFERENCE TO RELATED APPLICATIONS

This application is a U.S. National Phase Application under 35 U.S.C. § 371 of International Application No. PCT/EP2018/056855, filed on Mar. 19, 2018, and claims benefit to German Patent Application No. DE 10 2017 002 719.6, filed on Mar. 21, 2017. The International Application was published in German on Sep. 27, 2018 as WO 2018/172268 under PCT Article 21(2).

FIELD

The invention relates to an electronically controllable brake system and to a method for controlling said electronically controllable brake system.

BACKGROUND

The brake system in a vehicle, preferably a utility vehicle, can be provided with two or more service brake circuits in which a service-brake brake pressure which is applied to service brakes is set, and a parking brake circuit, in which a parking-brake brake pressure which is applied to spring-loaded brakes is set. The application of the service-brake brake pressure to the service brake for example takes place via a pressure modulator which outputs a service-brake brake pressure to the respective service brakes according to a service-brake braking specification in the form of a pneumatic service-brake control pressure or an electrical service-brake control signal.

In a normal operation, the specification to the pressure modulator is issued electrically via the service-brake control signal, wherein the service-brake control signal is determined and output by a service-brake control module as a function of a manually specified service-brake braking specification and/or as a function of an assistance braking specification which is requested in an automated fashion by an assistance system. In the case of redundancy, e.g. when there is an electrical failure of the service-brake control module, the specification to the actuator takes place via the service-brake control pressure which is specified to the pressure modulator via a pneumatic redundancy port and which is output, for example, by a service-brake activation device which is embodied as an electropneumatic service-brake valve, with a brake pedal, as a function of the service-brake braking specification.

The parking brake circuit serves mainly to park the vehicle in a parking situation or to carry out auxiliary braking or emergency braking during travel in that a parking-brake brake pressure is applied under control by a parking-brake control module, as a function of which parking-brake brake pressure the application of spring-loaded brakes is carried out, wherein the parking-brake brake pressure is reduced for the application of the brakes. For example, such a parking-brake control module or a handbrake module is described in DE 10 2015 008 377 A1. The parking brake circuit and the service brake circuits conventionally operate separately from one another. In specific applications, it is possible to replace the redundancy mechanism, described above, of the service brake with the alternative actuation of the handbrake circuit. For this purpose, the electrical voltage supply of the parking brake must usually be provided independently of the voltage supply of the service brake.

In the event of a failure of the electrical actuation of the service-brake circuits via the service-brake control module, it is possible, as described, for a pneumatic first fallback level, which is controlled by the driver, to be formed. However, if the driver is not available as a fallback level, since he is e.g. inattentive or in the event of relatively highly automated driving maneuvers not being in place, a second fallback level can be formed which can intervene under automated and electronic control, wherein the existing parking brake circuit is used for this purpose. The automated braking request is fed to the parking-brake control module after detection of the electrical failure in one of the service brake circuits, which parking-brake control module can correspondingly activate the spring-loaded brakes by specifying the parking-brake brake pressure, in order to compensate for the electrical failure of the service brakes. Alternatively, the automated braking request can be fed continuously to the parking-brake control module, and when a failure is detected in at least one of the service brake circuits by the parking-brake control module the latter can correspondingly activate the spring-loaded brakes by specifying the parking-brake brake pressure. However, in this case, under certain circumstances braking is carried out at only one vehicle axle on which the spring-loaded brakes are arranged in the parking brake circuit. This can lead to limited deceleration performance and, under certain circumstances, to additional instabilities during travel.

In order to avoid this, EP 2 090 481 B1 describes an electronically controllable brake system in which a rear-axle service brake circuit is controlled by a rear-axle service brake control module, and a front-axle service brake circuit is controlled by a front-axle service brake control module. The parking brake control module for the parking brake circuit is integrated into the front-axle service brake control module, wherein the parking brake circuit controls spring-loaded brakes on the rear axle. The rear-axle service brake control module and the components of the rear-axle service brake circuit are supplied with energy by a first energy source, and the front-axle service brake control module and the parking-brake control module with the correspondingly assigned components are supplied with energy by a second energy source.

In the event of a failure of the first energy source, i.e. the rear-axle service brake circuit with the service brakes on the rear axle, the front axle can be braked further via the front-axle service brake circuit and the rear axle can be braked via the parking brake circuit, so that both vehicle axles can be continued to be braked. The parking brake circuit therefore compensates the failure of the rear-axle service brake circuit in that instead of being braked with the service brakes it is braked with the spring-loaded brakes on the rear axle. In the event of a failure of a second energy source, i.e. both of the parking brake circuit on the rear axle and of the front-axle service brake circuit, a service-brake control signal is output by the rear-axle service brake control module, which service-brake control signal is, as in normal operation, transmitted to the rear-axle pressure modulator but additionally also to a trailer control valve of the vehicle. The trailer control valve generates a corresponding control pressure which, when it is present, is transmitted to the trailer in order to bring about braking there and at the same time also via a redundancy pressure line to the pneumatic redundancy port on the front-axle pressure modulator. The rear axle and the front axle are therefore braked, as in normal operation, via the service brakes, and the front axle is also controlled by the rear-axle service brake control module.

The parking-brake control module can continue to output a parking-brake control pressure to the trailer control valve which inverts this and passes it onto the service brakes of the trailer, in order to be able to implement a parking brake function also in the trailer.

Therefore, in the prior art it is proposed to actuate each service brake circuit via separate control modules and to compensate a failure of an energy source and therefore of at least one service brake circuit by virtue of the fact that the respectively still functioning brake circuit or circuits performs/perform braking on the vehicle axle where there has been a failure, so that even in the case of redundancy both vehicle axles can still be used for braking.

It is disadvantageous here that no such compensation can take place in electronically controlled brake systems which actuate the service brakes on the rear axle and on the front axle and, if appropriate, on further vehicle axles via the pressure modulator via only one central service-brake control module, since in the event of a failure of the energy source or of individual electrical components of the respective service brake circuit the central service-brake control module can no longer perform the electrical actuation of the service brakes or of the pressure modulators, connected upstream, on individual vehicle axles. Therefore, if they are present in the corresponding brake system, it is only possible to switch over to the pneumatic first fallback level which is controlled by the driver, if the driver also actually intervenes manually. However, a purely electronic braking specification as described in EP 2 090 481 B1 or a possible assistance braking specification which is specified in an automated fashion can no longer be implemented.

SUMMARY

In an embodiment, the present invention provides an electronically controllable brake system for a vehicle. The electronically controllable brake system includes at least one service brake circuit with service brakes and a service brake control module, wherein a service-brake brake pressure can be fed to the service brakes, and the service-brake control module is designed to generate a service-brake control signal as a function of a braking specification, wherein the service-brake brake pressure can be generated as a function of the service-brake control signal and specified to the service brakes, for the implementation of the braking specification via the at least one service brake circuit, under electrical control by the service-brake control module. The electronically controllable brake system further includes a parking brake circuit with spring-loaded brakes, wherein a parking-brake brake pressure can be fed to the spring-loaded brakes, wherein the parking-brake brake pressure can be generated as a function of the braking specification and specified to the spring-loaded brakes, in order to implement the braking specification via the parking brake circuit. In addition, the electronically controllable brake system includes an inverter control valve with an inverter output and/or a redundancy output, wherein the inverter control valve is designed to generate an inverter control pressure and to output it via the inverter output and/or the redundancy output, wherein the inverter control pressure is inversely proportional to the parking-brake brake pressure and/or a parking-brake control pressure which specifies the parking-brake brake pressure, which parking-brake brake pressure and parking-brake control pressure are to be applied in order to implement the braking specification in the parking brake circuit via the spring-loaded brakes. The service-brake brake pressure can be applied to the service brakes of the at least one service brake circuit as a function of the inverter control pressure predefined by the inverter control valve, if implementation of the braking specification via the at least one service brake circuit and the electrical control of service-brake control module is prevented.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
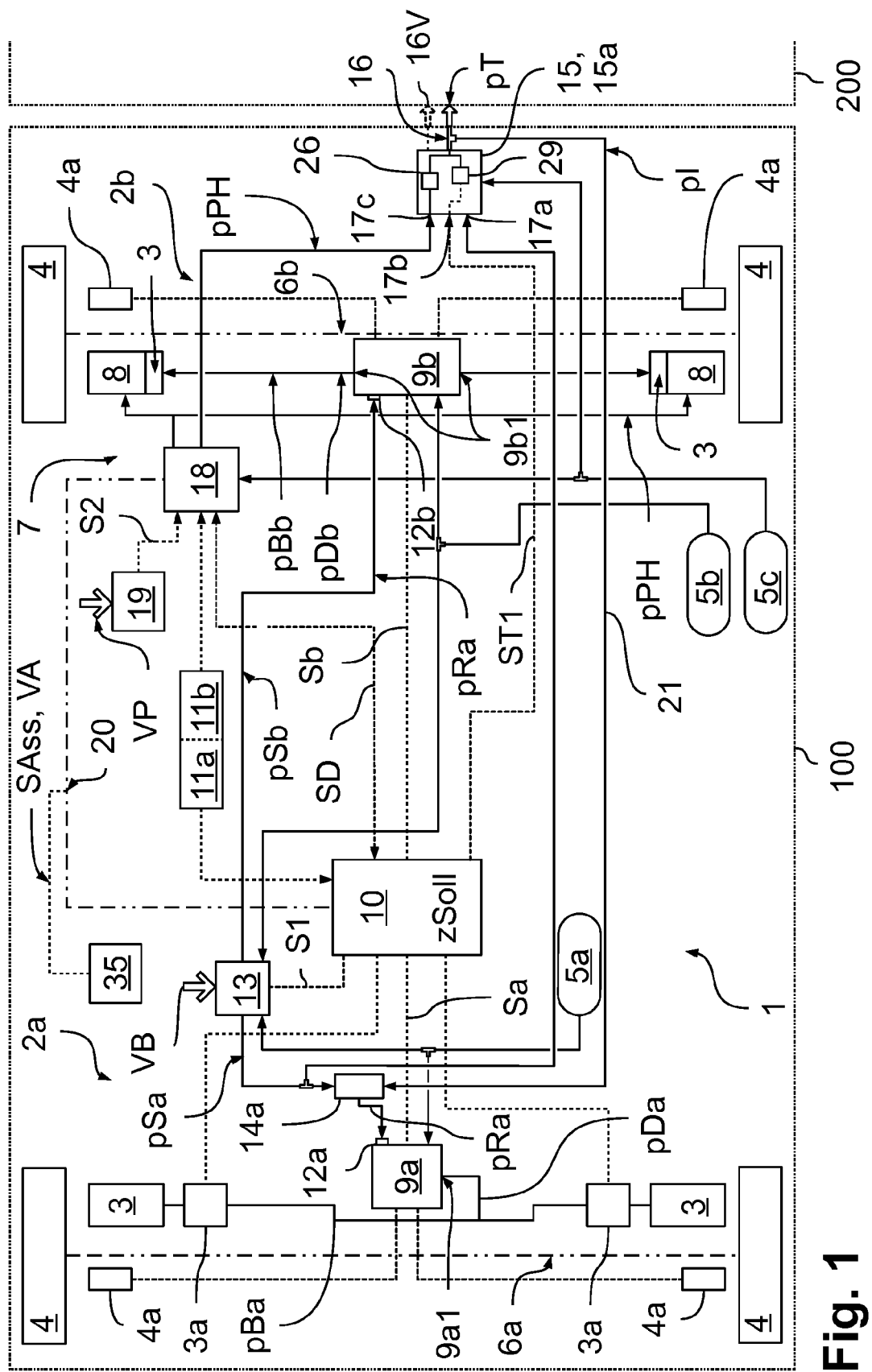
FIG. 1 shows an electronically controllable brake system with an electrically controllable parking brake according to a first embodiment.

Embodiments of the invention provide electronically controllable brake systems and methods for controlling electronically controllable brake systems which permit, in a simple and reliable fashion, electrically redundant actuation of service brakes on both vehicle axles.

Embodiments of the invention provide that, in an electronically controllable brake system in a vehicle, in particular a utility vehicle, with at least one service brake circuit in which a service-brake brake pressure at service brakes is applied, the service-brake brake pressure is defined as a function of an inverter control pressure which is generated in an inverter control valve, if implementation of a specific requested braking specification via the at least one service brake circuit under electrical control by a service-brake control module is prevented, wherein in the case of electrically controlled implementation of the braking specification in a normal case the service-brake brake pressure can be generated as a function of a service-brake control signal which is generated by the service-brake control module, and said service-brake brake pressure can be output to the service brakes of the respective service brake circuit.

The electrically controlled implementation of the braking specification is not possible, for example, in the event of an electrical failure in at least one of the service brakes. An electrical failure includes here, within the scope of the invention, in particular the case in which generation of the service-brake control signal in the service-brake control module fails, e.g. because the service-brake control module has an electrical defect and therefore it is not possible to specify the service-brake brake pressure as a function of the service-brake functional signal, which in this case is not present. Furthermore, an electrical failure can occur if although a service-brake control signal can be generated and output by the service-brake control module, said service-brake control signal cannot however be converted into a service-brake brake signal, for example owing to an electrical defect in a random electrical component of the respective service brake circuit.

The inverter control valve is designed, according to embodiments of the invention, to generate the inverter control pressure as a function of a braking specification which can be implemented in a parking brake circuit of the brake system, wherein the inverter control pressure is defined for this purpose in such a way that it is inversely proportional to a parking-brake brake pressure and/or parking-brake control pressure and/or a control pressure which is associated with it, which pressures can be generated as a function of the braking specification in the parking brake circuit and spring-loaded brakes which are arranged in the parking brake can be actuated as a function thereof, in order to implement the braking specification via the parking brake circuit.

As a result, it is already possible to obtain the advantage that in the event of an electrical failure in the at least one service brake circuit, as a result of which the service-brake brake pressure can no longer be defined as a function of an electrically specifiable service-brake control signal or an electrically controlled implementation of a specific braking specification by the service-brake control module can no longer take place, a braking specification which is predefined to the parking brake circuit can be diverted to the at least one service brake circuit via the inverter control valve. In the event of an electrical failure of the at least one service brake circuit, the braking specification which is predefined to the parking brake circuit is not necessarily also implemented here by the spring-loaded brakes in the parking brake circuit. For example, there can also be provision that in the event of such an electrical failure only the parking-brake brake pressure and/or the parking-brake control pressure and/or a control pressure which is associated therewith is generated in the parking brake circuit, but transmission or implementation of these pressures via the spring-loaded brakes is prevented, and these pressures are diverted in an inventive fashion to the at least one service brake circuit only via the inverter control valve, in order to be able to implement the braking specification, specified to the parking brake circuit, in the at least one service brake circuit, and therefore to easily compensate for the electrical failure in the at least one service brake circuit.

In order to be able to bring about application of the respective pressures in the respective brake circuits there is provision that the at least one service brake circuit is supplied with energy by a first energy source, and the parking brake circuit and depending on the design also the inverter control valve are supplied with energy by a second energy source, wherein the first energy source is independent of the second energy source. This is intended to ensure that in the event of a failure of the first energy source for the service brake circuit in the parking brake circuit it will continue to be possible to apply pressures and these pressures will continue to be able to be inverted by the inverter control valve, in order to be able to specify the inverter control pressure to the failed service brake circuit or circuits.

The inversion which is brought about in the inverter control valve preferably takes place via an inverse relay valve which is arranged in the inverter control valve. Inversion can be understood to mean that the inverter control valve or the inverse relay valve ensure that an inverter control pressure which is inversely proportional to the parking-brake brake pressure and/or parking-brake control pressure is generated and output. As a result, it can advantageously be ensured that a parking-brake brake pressure which can be generated in the parking brake circuit in order to actuate the spring-loaded brakes and/or parking brake control pressure, which each characterize the braking specification which is specified to the parking brake circuit, can be used immediately after the inversion to actuate the service brakes and to convert the braking specification in the at least one service brake circuit via said service brakes. That is to say via the service brakes in the service brake circuit, approximately the same braking effect is achieved as a function of the inverted parking-brake brake pressure and/or the inverted parking-brake brake pressure as via the spring-loaded brakes in the parking brake circuit as a function of the parking-brake brake pressure and/or the parking-brake control pressure. Therefore, in the event of an electrical failure in the service brake circuits it is possible to dispense with costly pressure control means for generating the service-brake brake pressure.

The inverter control valve can additionally ensure scaling here, i.e. the braking effect at the service brakes can be scaled, i.e. increased or reduced, by a factor with respect to the braking effect at the spring-loaded brakes, for example in order to improve the driving stability of the vehicle during braking. Furthermore, there can be provision that the inverter control pressure is specified to only one service brake circuit, in particular to a front-axle service brake circuit or else to further service brake circuits in the vehicle if an electrical failure has occurred and the failure is to be compensated by braking at further vehicle axles with service brakes. The embodiment variants which are described below are to be correspondingly provided in an identical fashion on just one vehicle axle or, if appropriate, also on further vehicle axles or in further service brake circuits.

According to one advantageous embodiment the inverter control valve can be embodied as a trailer control valve to which the parking-brake brake pressure which is generated in the parking brake circuit on the basis of the braking specification and/or parking-brake control pressure and/or a control pressure which is associated therewith can be fed and which inverts this parking-brake brake pressure and/or parking-brake control pressure and/or the control pressure associated therewith via an integrated inverse relay valve.

Through recourse to a trailer control valve, which is already present in many utility vehicles and via which a trailer control pressure which is inverse with respect to the parking-brake brake pressure and/or parking-brake control pressure can be generated and applied to a brake system in a possibly coupled trailer, in order to actuate service brakes therein, there can be a saving in costs since the inversion function of the trailer control valve for generating the trailer control pressure can simultaneously also be used to generate the inverter control pressure and therefore to specify the service-brake brake pressure in the failed service brake circuit. As a result, the space requirement and the expenditure on open-loop and closed-loop control in the brake system can be minimized, since it is not necessary to install and actuate additional components in the vehicle. All that is necessary to ensure is that in the event of an electrical failure the inverter control pressure can be input into the corresponding service brake circuit.

According to a first alternative, the parking brake circuit in the brake system can have a parking-brake control module which generates the parking-brake brake pressure as a function of the braking specification, wherein in this alternative the braking specification is electrically transmitted to the parking-brake control module. The parking brake control module is connected to the spring-loaded brakes of the parking brake circuit, in order to transmit the parking-brake brake pressure pneumatically to the spring-loaded brakes. That is to say an electrically controlled parking brake is present.

The braking specification to the parking brake circuit can be, within the scope of the invention, an assistance braking specification which is requested in an automated fashion and which is generated by an assistance control module in an automated fashion. The assistance control module is provided for controlling the vehicle in an automated fashion on the basis of surroundings information, wherein the vehicle can be braked in an automated fashion on the basis of the assistance braking specification, and the assistance braking specification can for this purpose be implemented both by the at least one service brake circuit and via the parking brake circuit. Furthermore, the braking specification can be a parking-brake braking specification which is requested manually by the driver via a parking-brake activation device and/or a service-brake braking specification which is requested manually via a service-brake activation device, e.g. an electropneumatic service brake valve or a purely electrically controlled service-brake activation device and which in this way can also be specified redundantly via the inverter control valve to the service brakes in the respective service brake circuit for implementation.

In the event of an electrical failure of the at least one service brake circuit or of the parking brake circuit, there can be provision within the scope of redundant braking that the respective braking specifications to the respective still functioning brake circuits are applied in order to compensate for the electrical failure. This can be ensured by corresponding networking of the respective components e.g. via a random vehicle-internal (bus) network or CAN bus or via a direct connection of the individual components. Accordingly, all the specified braking specifications can serve as redundant braking specifications in each of the brake circuits, and in the event of an electrical failure of one of the service brake circuits, they can be input via the parking brake circuit into the brake system and can be applied to the at least one service brake circuit via the inverter control valve.

In order to ensure this, the parking-brake control module of the electrically controlled parking brake is also connected to the inverter control valve in order to transmit the parking-brake brake pressure or a pressure associated therewith, for example a control pressure generated internally in the parking-brake control module, pneumatically to the inverter control valve and to invert it therein and output it as an inverter control pressure.

According to an alternative embodiment, the pneumatic parking brake is provided, wherein for this purpose a parking brake valve is arranged in the parking brake circuit, which parking brake valve can be activated manually by the driver in order to request the parking-brake braking specification. The parking brake valve outputs, as a function of the parking-brake braking specification a parking-brake control pressure which is increased in air volume in a relay valve and subsequently output as a parking-brake brake pressure to the spring-loaded brakes, in order to implement the parking-brake braking specification. The parking-brake control pressure which is output by the parking brake valve or a pressure which is associated therewith is transmitted to the inverter control valve via a pressure line, and is inverted therein via the inverse relay valve, in order to specify the inverter control pressure.

Therefore, in two alternatives, a parking-brake braking specification can be transmitted via a pneumatic parking brake or a parking-brake braking specification and/or an assistance braking specification and/or also a service-brake braking specification can be transmitted to the inverter control valve via an electric parking brake in the parking brake circuit. In the case of an electrical failure of the at least one service brake circuit, it is therefore possible to have recourse to the parking brake circuit which is present in the vehicle, in order to receive via the latter a braking specification in the form of a manual parking-brake braking specification and/or service-brake braking specification and/ or the assistance braking specification which is requested in an automated fashion, and to divert it via the inverter control valve to the service brakes and therefore to actuate the latter redundantly.

According to a further alternative, the parking brake control module can also be integrated into the inverter control valve, and the assistance braking specification and/or the parking-brake braking specification and/or the service-brake specification can be transmitted electrically to the inverter control valve, e.g. via a (bus) network and/or a direct connection. The parking-brake brake pressure can be generated in the inverter control valve via the parking-brake control module on the basis of the assistance braking specification and/or the parking-brake braking specification, and said parking-brake brake pressure can be transmitted to the spring-loaded brakes via a parking-brake output on the inverter control valve, if braking via the spring-loaded brakes is desired.

The inverter control pressure can be generated on the basis of the assistance braking specification and/or the parking-brake brake specification and or the service-brake brake specification in an electrically controlled fashion and output to the inverter output via an inverter control module which is integrated into the inverter control valve, can also be a component of the parking brake control module and contains a pilot control module with electrically controllable pressure valves, wherein the parking-brake brake pressure which is generated in the parking-brake control module is inversely proportional to the inverter control pressure generated by the pilot control module. The inverter control pressure generated as a result is then also used redundantly to actuate the service brakes.

So that, in the case of an electrical failure of the service brake circuits, the inverter control pressure which is output via the inverter control valve via the inverter output can be applied to the service brakes and so that said inverter control pressure can therefore be fed into the respective service brake circuit, a redundancy pressure line which starts from the inverter output leads to the respective service brake circuits. The position of the feed into the respective service brake circuit can be defined as follows:

Firstly, in the at least one service brake circuit in each case a pressure modulator is provided which is designed to output a pressure-modulator output pressure via a pressure modulator output as a function of the service-brake control signal, wherein the pressure-modulator output pressure can be transmitted as a service-brake brake pressure to the service brakes in order to implement a requested braking specification. This is the case during normal operation, i.e. without electrical failure in the service brake circuits, of the brake system.

According to one embodiment, the pressure modulator has a pneumatic redundancy port, wherein either the inverter control pressure or a service-brake control pressure which is output by the service-brake activation device, embodied as an electropneumatic service brake valve, on the basis of the service-brake braking specification, can be specified to the pneumatic redundancy port as a redundancy pressure. According to this embodiment, the feeding of the inverter control pressure into the service brake circuit can therefore take place via the pneumatic redundancy port on the respective pressure modulator.

The optional specification of the redundancy pressure preferably takes place via a switching valve which is connected upstream of the redundancy port, wherein, in a first switching-valve switched position, the switching valve connects the service brake valve to the redundancy port in order to specify the service-brake control pressure as a redundancy pressure, and in a second switching-valve switched position the switching valve outputs the inverter control pressure to the redundancy port of the pressure modulator in order to specify the inverter control pressure as a redundancy pressure.

The pressure modulator is designed, if specification of the service-brake brake pressure as a function of a service-brake control signal is not possible, i.e. electrical failure has occurred in the respective service brake circuit, to generate the pressure-modulator output pressure as a function of the service-brake control pressure which is optionally fed to the redundancy port or of the inverter control pressure. As a result, it is easily possible to form two fallback levels in which redundant braking can be specified and implemented manually or in an automated fashion via the parking brake circuit or manually directly via the service brake valve. For this purpose, in an existing brake system with a pneumatically redundant and electrically actuatable pressure modulator, advantageously only one additional switching valve has to be provided for this purpose, via which switching valve the inverter control pressure which is generated in the inverter control valve can be output to the redundancy port.

According to an alternative embodiment, in which the pressure modulator can only be actuated electrically and accordingly a redundancy pressure cannot be predefined, the switching valve is arranged upstream of the service brakes in the at least one service brake circuit in the pressure path transmitting the service-brake brake pressure, so that either the pressure-modulator output pressure or the inverter control pressure can be specified as the service-brake brake pressure. In this case, the service-brake activation device is preferably embodied in a purely electrically controlled fashion, i.e. a service brake valve is not provided.

In the first switching-valve switched position the pressure modulator output is connected to the service brakes in order to specify the pressure-modulator output pressure as a service-brake brake pressure to the service brakes, and in the second switching-valve switched position, the inverter control pressure is output to the service brakes in order to specify the inverter control pressure, which is, if appropriate, additionally increased in volume, as a service-brake brake pressure to the service brakes.

According to one embodiment, the switching valve can for this purpose be arranged directly on a vehicle axle which is assigned to the at least one service brake circuit, wherein the inverter control valve then outputs the generated inverter control pressure via a redundancy pressure line to the switching valve upstream or downstream of the pressure modulator on the respective vehicle axle.

According to one alternative embodiment, the switching valve is integrated as an inverter switching valve into the inverter control valve. Accordingly, either the service-brake control pressure or the pressure-modulator output pressure is to be fed to the inverter control valve, depending on the design of the brake system, in order to specify said pressures to the integrated inverter switching valve. The specification of the redundancy pressure to the redundancy port then takes place by virtue of the fact that in the first switching-valve switched position the service brake valve is connected via the inverter switching valve to an additional redundancy output on the inverter control valve, and in the second switching-valve switched position the inverter control pressure which is generated in the inverter control valve is output via the inverter switching valve to the redundancy output, wherein the redundancy output of the inverter control valve is connected to the redundancy port of the pressure modulator or to the service brakes.

Therefore, in two alternative arrangements of the switching valve it is advantageously possible for switching to take place between the driver's request and the inverter control pressure, wherein in the case of the solution which is integrated into the inverter control valve, improved retrofittability is provided. In that case, the switching function can be retrofitted at the same time as the installation of the inverter control valve in the vehicle. In addition, there can be a saving in space on the vehicle axles, since installment of the switching valves on the vehicle axle can be dispensed with. In addition, just one switching valve can be used for both vehicle axles.

On the other hand, with the switching valves which are arranged on the vehicle axles it is possible to bring about different redundant actuation on each axle, and when there is a trailer control valve already present with an inversion function, the brake system can be upgraded in a modular fashion by retrofitting individual switching valves on the vehicle axles.

If there is provision in the integrated solution for the inverter control pressure to also be used as a trailer control operating pressure for outputting to a trailer, the inverter control pressure is to be output separately as a trailer control pressure via the inverter output ("yellow coupling head"). In this case, therefore in contrast to the other solution, the specifications to the trailer and the service brake circuit can be made via the same inverter output, which corresponds to the "yellow coupling head".

The switching can take place in a situationally conditioned fashion, for example when a redundant service-brake braking specification by the driver has been sensed and stronger braking is requested via this service-brake braking specification than via some other redundant braking specification which is not requested by the driver and which is currently being implemented at the respective time. Otherwise, there can also be provision that when a service-brake braking request by the driver is sensed another currently implemented braking specification, which causes, in particular, a stronger braking effect than the manually requested service-brake braking specification, is ended in a controlled fashion and subsequently the switching valve is moved into the first switching-valve switched position in which the service-brake braking specification can be implemented by the driver. Instabilities during the switching can be avoided by means of this procedure.

The switching of the switching valve into the first switching-valve switched position when a driver's request is present can take place here in a pneumatically or electrically controlled manner depending on the type of switching valve, i.e. the switching valve is switched automatically into the first switching-valve switched position by virtue of the fact that a certain service-brake brake pressure is present at the switching valve, or the service-brake brake pressure is measured, preferably with a pressure sensor, and the switching valve is moved into the first switching-valve switched position under electrical control as a function of the measurement.

In both embodiments, the switching valve can be embodied for this purpose as a shuttle valve or select high valve or as an electrically or pneumatically controllable 3/2-way valve, wherein the shuttle valve is designed to output the higher of the two pressures present at the switching-valve inputs to the switching-valve output (select high valve). In order to be able to switch to the driver's request in a situation-dependent fashion in this case, it is necessary to ensure that the inverter control pressure which is also fed to the shuttle valve is reduced in a controlled fashion, i.e. redundant braking which has already been carried out is ended in a controlled fashion. As a result, when a service-brake braking specification which is pneumatically predefined via the service brake valve is present, the inverter control pressure is lower than the service-brake control pressure so that the shuttle valve which is embodied as a select high valve is moved automatically into the first switching-valve switched position.

The 3/2-way valve switches into the first switched position or the second switched position as a function of an, for example, electrically specified switching signal. Therefore, with both variants of the switching valve it is advantageously possible to specify automatically or in an actively controlled fashion which braking specification is fed to the service brakes, in particular in the case of an electrical failure of the at least one service brake circuit.

The switching signal can for this purpose preferably be generated as a function of whether a manually requested service-brake braking specification is present, i.e. the driver would like to intervene in the braking. For this purpose, for example a pressure sensor can be provided in the brake system, preferably in the inverter control valve or on the service brake valve, wherein the pressure sensor is designed to measure the service-brake control pressure applied by the service brake valve, and to output a braking request signal as a function of said pressure. The switching signal is then output to the 3/2-way valve as a function of the braking requests in order to set the corresponding switching-valve switched position. According to a further alternative, the 3/2-way valve can also have a pneumatic control input to which e.g. the service-brake control pressure or a pressure which is proportional thereto is fed as a switching control pressure. The switching valve can then be switched into the corresponding switching-valve switched position on the basis of the switching control pressure at the pneumatic control input. The braking request can also alternatively be detected electrically if, for example, a purely electric service-brake activation device is present, and the corresponding switching-valve switched position can be set as a function of this electrical detection.

In both variants of the switching valve, it is therefore possible to ensure, in particular in the case of electrical failure of the at least one service brake circuit and subsequently induced redundant braking, that the driver can intervene redundantly in the braking by correspondingly switching the switching valve if the driver is in place or attentive, and also intervenes in a pneumatically redundant fashion himself via the service-brake valve. When a service-brake braking specification is present, an inverter control pressure which is also possibly redundantly specified on the basis of the braking specification in the parking brake circuit can be ended in a controlled fashion by the driver before the first switching-valve switched position is set, in order to subsequently implement the driver's request.

In order to prevent redundant braking in certain situations by predefining the inverter control pressure at at least one of the service brake circuits via the redundancy pressure line, there can be provision to arrange, in the redundancy pressure line, a shutoff valve which is connected upstream of the inverter output or of the redundancy output of the inverter control valve, wherein in a first shutoff-valve switched position the shutoff valve connects the redundancy pressure line to a bleeding port for bleeding the redundancy pressure line, and in a second shutoff-valve switched position the shutoff valve connects the redundancy pressure line to the inverter output or the redundancy output of the inverter control valve in order to redundantly specify the service-brake brake pressure as a function of the inverter control pressure.

The additional shutoff valve is advantageous here for the desired shutoff function in particular when a shuttle valve is provided as the switching valve. However, if the switching valve is embodied as an electrically controllable 3/2-way valve, the shutoff valve can also be dispensed with and the shutoff function of the shutoff valve can instead also be ensured by the switching valve which is present in any case by virtue of the fact that said shutoff valve is moved by electrical actuation into the corresponding switching-valve switched position in which the service-brake brake pressure is not specified by the inverter control pressure but rather by the service-brake control pressure which also brings about bleeding without activation of the service brake valve.

The shutoff valve can also be integrated in a corresponding form into the inverter control valve and therefore specify whether a pressure is output at the inverter output or at the redundancy output of the inverter control valve or whether the redundancy pressure line is to be bled. As a result, the retrofittability and the space requirement can be improved, since only one compact component has to be retrofitted or provided.

Therefore, the specification of the inverter control pressure to the service brakes can be easily prevented if, for example in the case of permanent shutting off of the vehicle, it is not desired to supply the service brakes continuously with a service-brake brake pressure. In the case of shutting off, the service brakes can be bled for this purpose via the bleeding port in the corresponding shutoff-valve switched position. As a result it is possible to avoid bleeding of service-brake pressure medium reservoirs in the brake system if leakages occur in the service brake circuit.

According to the invention it is accordingly possible in a method firstly to detect whether the service-brake brake pressure in the at least one service brake circuit is possible, as a function of the service-brake control signal which can be output e.g. by the service-brake control module, for implementing the respective braking specification of the service brakes, and accordingly the desired braking specification can be implemented under electrical control. If this is not the case, i.e. if, for example a defect is present in the service-brake control module and the latter correspondingly cannot output any service-brake control signals, the inverter control pressure is generated in the inverter control valve, as described above, by means of inversion, as a function of the braking specification specified to the parking brake circuit, and the service-brake brake pressure in the at least one service brake circuit is output, as described, as a function of the inverter control pressure.

In this context, there can either be provision for the inverter control pressure to be applied directly as a service-brake brake pressure to the service brakes or for it firstly to be used to actuate the pressure modulator in a pneumatically redundant fashion, after which the pressure modulator generates the service-brake brake pressure as a function thereof and applies it to the service brakes.

FIG. 1 shows a schematic illustration of a vehicle 100 with a brake system 1, which can be braked in two service brake circuits 2a, 2b via service brakes 3 on the wheels 4. A front-axle service brake circuit 2a is assigned to a front axle 6a, and a rear-axle service brake circuit 2b assigned to a rear axle 6b. Further vehicle axles can also be provided, to which the vehicle axle service brake circuits 6a and 6b or further service brake circuits are assigned. In each case the pressure medium reservoir 5a, 5b is assigned on an axle basis to the service brake circuits 2a, 2b.

A parking brake circuit 7 is also assigned to the rear axle 6b, wherein the wheels 4 on the rear axle 6b can be braked in this parking brake circuit 7 via a spring-loaded brakes 8, so that the wheels 4 of the rear axle 6b can be decelerated both in the rear-axle service brake circuit 2b via the service brakes 3, and in the parking brake circuit 7 via the spring-loaded brakes 8. For this purpose, combined service/spring-loaded brakes are provided on the rear axle 6b. The parking brake circuit 7 is supplied with pressure medium by an independent parking-brake pressure medium reservoir 5c.

In order to activate the service brakes 3 and therefore to implement a requested braking specification which is characterized by a vehicle setpoint deceleration zSoll or a setpoint brake pressure, in each case a pressure modulator 9a, 9b is arranged in each of the two service brake circuits 2a, 2b on the respective vehicle axle 6a, 6b, wherein the two pressure modulators 9a, 9b according to this exemplary embodiment can be actuated electrically or pneumatically in order to apply a specific service-brake brake pressure pBa, pBb to the service brakes 3 of the respective vehicle axle 6a, 6b and therefore bring out application of the service brakes 3. Basically, the service-brake brake pressure pBa, pBb can be specified individually for each of the individual service brakes 3, for example within the scope of a traction control process which is carried out at the individual wheels 4 on the basis of the data from wheel speed sensors 4a. The traction control process can take place directly on the rear axle 6b by means of the rear-axle pressure modulator 9b, and on the front axle 6a via ABS control valves 3a which are connected upstream of the service brakes 3.

In the normal driving mode, the respective pressure modulators 9a, 9b are actuated electrically via service-brake control signals Sa, Sb, wherein the respective service-brake control signals Sa, Sb are generated in a service-brake control module 10, as a function of the respective braking specification or the vehicle setpoint deceleration zSoll, in such a way that the respective pressure modulator 9a, 9b applies to the service brakes 3 a service-brake brake pressure pBa, pBb with which the requested braking specification is implemented. The service-brake control signal Sa, Sb can be output here, for example via a CAN bus or some other network, an analogue or pulse-width-modulated control signal with which a pressure-modulator output pressure pDa, pDb is generated in a known fashion in the pressure modulator 9a, 9b via pressure valves, which pressure-modulator output pressure pDa, pDb is output as a service-brake brake pressure pBa, pBb via a pressure-modulator output 9a1, 9b1 to the respective service brake 3.

The pressure modulators 9a, 9b are therefore each electrically connected to the service-brake control module 10 which can electrically control the braking effect on an individual basis in the two service-brake brake circuits 2a, 2b, and in this context is embodied as a central control module which during normal operation is responsible for the electrical implementation of the braking specification in the two service-brake brake circuits 2a, 2b. The service-brake control module 10 and the respective pressure modulators 9a, 9b as well as further components of the respective service-brake brake circuits 2a, 2b are supplied with energy by a first energy source 11a according to this exemplary embodiment.

The vehicle setpoint deceleration zSoll can be defined manually here by the driver, who predefines a service-brake braking specification VB, for example via a brake pedal, through manual activation of a service brake valve 13, which service-brake braking specification VB is output to the service-brake control module 10 via a service-brake activation signal S1 and from which the vehicle setpoint deceleration zSoll follows. Furthermore, in the automated driving mode an assistance braking specification VA which is specified in an automated fashion can be output by an assistance control module 35 via an assistance control signal SAss, which assistance braking specification VA is also transmitted to the service-brake control module 10, for example via a CAN bus 20 or another networking vehicle 100, and also corresponds to a specific vehicle setpoint deceleration zSoll.

The assistance control module 35 is designed here to control the vehicle 100 in an automated fashion on the basis of information about the surroundings, in particular to brake it according to the assistance braking specification VA, and, as a function thereof, to output the assistance control signal SAss in particular to the brake system 1.

In order to continue to ensure implementation of the service-brake braking specification VB or of the assistance braking specification VA, i.e. of the vehicle setpoint deceleration zSoll in the event of an electrical failure, a plurality of fallback levels can be switched to. In this context, the fallback levels ensure that the electrically controllable brake system 1 is suitable for a certain degree of automation within the scope of an electronically controlled autonomous driving mode. The fallback levels are configured as follows:

In a first fallback level, when an electrical failure is detected in one of the components of the two service brake circuits 2a, 2b, pneumatic redundancy ports 12a, 12b are automatically activated in the respective pressure modulator 9a, 9b. These cause the respective pressure modulator 9a, 9b to be no longer able to be actuated electrically via the service-brake control signals Sa, Sb, rather only pneumatically as a function of a specified redundancy pressure pRa, pRb which is present at the respective pneumatic redundancy port 12a, 12b. The specification of the respective redundancy pressure pRa, pRb is carried out differently per axle according to FIG. 1.

Accordingly, in the rear-axle service brake circuit 2b a rear-axle service-brake control pressure pSb, which is applied by the service-brake valve 13 is output as a rear-axle redundancy pressure pRb, to the pneumatic rear-axle redundancy port 12b via a pneumatic line. The service brake valve 13 applies the rear-axle service-brake control pressure pSb here as a function of the service-brake braking specification VB which is specified manually by the driver, so that the same braking is requested pneumatically by means of the rear-axle service-brake control pressure pSb as via the rear-axle service-brake control signal Sb.

In the front-axle service brake circuit 2a it is possible to specify as a front-axle redundancy pressure pRa, e.g. a front-axle service-brake control pressure pSa which is also applied by the service-brake brake valve 13 according to the service-brake braking specification VB, wherein said front-axle service-brake control pressure pSa is, in contrast to the rear-axle service brake circuit 2b, not output directly to the front-axle pressure modulator 9a or the pneumatic front-axle redundancy port 12a thereof. Instead, a front-axle switching valve 14a is arranged upstream of the pneumatic front-axle redundancy port 12a, which front-axle switching valve 14a can be switched into two switching-valve switched positions X1, X2. For the sake of clarity, the reference symbols which are used below for the components of the front-axle switching valve 14a are not illustrated in FIG. 1. Instead, reference is made to the view of the detail in FIGS. 2a and 2b.

The front-axle switching valve 14a has a first front-axle switching valve input 14a1, a second front-axle switching valve input 14a2 and a front-axle switching-valve output 14a3, wherein the front-axle switching-valve output 14a3 is connected to the pneumatic front-axle redundancy port 12a on the front-axle pressure modulator 9a and the first front-axle switching-valve input 14a1 is connected to the service brake valve 13. If the front-axle switching valve 14a is in its first switching-valve switched position X1, the front-axle service-brake control pressure pSa which is specified by the service brake valve 13 and is present at the first front-axle switching-valve input 14a1 is passed through to the pneumatic front-axle redundancy port 12a, so that in this first switching-valve switched position X1 the pneumatically specified service-brake braking specification VB of the driver is implemented by the front-axle pressure modulator 9a in that the front-axle service-brake control pressure pSa is output with an increased air quantity to the service brakes 3 of the front axle 6a.

The service-brake braking specification VB, i.e. a specific specified vehicle setpoint deceleration zSoll, which is specified by the driver by means of the service brake valve 13, can therefore be implemented by the respective pressure modulator 9a, 9b during normal operation as a function of the service-brake control signals Sa, Sb which are output electronically by the service-brake control module 10 or in the first fallback level as a function of the service-brake control pressures pSa, pSb which are applied directly in a pneumatic fashion by the service-brake valve 13.

The second front-axle switching valve input 14a2 of the front-axle switching valve 14a is connected to an inverter control valve 15 via a redundancy pressure line 21. As a result, in the second switching-valve switched position X2 of the front-axle switching valve 14a an inverter control pressure pI, which is output from an inverter output 16 of the inverter valve 15, can be passed through as a front-axle redundancy pressure pRa to the pneumatic front-axle redundancy port 12a of the front-axle pressure modulator 9a. As a result, the service brakes 3 on the front axle 6 can be additionally supplied with a front-axle brake pressure pBa which is dependent on the inverter control pressure pI. This permits a second fallback level to be formed as follows:

The specification of the inverter control pressure pI by the inverter control valve 15 can take place basically as a function of different paths:

According to FIG. 1, e.g. the front-axle service-brake control pressure pSa, which is applied directly by the service brake valve 13 as a function of the service-brake braking specification VB, can be fed to the inverter control valve 15 via a first inverter input 17a via a pressure line. In the inverter control valve 15, said front-axle service-brake control pressure pSa is output, having been increased in terms of air quantity and subsequently as an inverter control pressure pI, to the inverter output 16, wherein the increasing of the air quantity takes place with the pressure medium from the parking-brake pressure medium reservoir 5c, which pressure medium is also fed to the inverter control valve 15. The inverter control pressure pI which is generated in the inverter control valve 15 can be output to a possibly coupled trailer 200 via the inverter output 16 as a trailer control pressure pT in order also to brake said trailer 200 as a function of the service-brake braking specification VB by the driver.

Furthermore, electrical specification of the service-brake braking specification VB to the inverter control valve 15 can take place via a second inverter input 17b, wherein the electrical braking specification according to this embodiment takes place via a first inverter control signal ST1 which is output by the service-brake control module 10 and is formed as a function of the vehicle setpoint deceleration zSoll. The first inverter control signal ST1 is transmitted directly to a pilot control module 29 in the inverter control valve 15 via the second inverter input 17b and actuates said valve as a function of the first inverter control signal ST1 in such a way that, by opening and closing pressure valves in the pilot control module 29 with the pressure medium from the parking-brake pressure medium reservoir 5c, a pressure which corresponds to the service-brake braking specification VB is generated, said pressure being output as an inverter control pressure pI at the inverter output 16. Therefore, a service-brake braking specification VB which is processed electrically via the service-brake control module 10 can also be transferred to a possibly coupled trailer 200 via the inverter control valve 15.

A third inverter input 17c on the inverter control valve 15 is connected via a pressure line to a parking-brake control module 18 which generates, in the parking brake circuit 7, a parking-brake brake pressure pPH, for example as a function of a parking-brake braking specification VP which is specified manually by the driver via a parking-brake activation device 19, and outputs this parking-brake brake pressure, or a control pressure, which is generated internally in the parking-brake control module 18 and as a function of which the parking-brake brake pressure pPH is generated, to the spring-loaded brakes 8, so that a certain braking effect can be achieved on the rear axle 6b via the spring-loaded brakes 8. For this purpose, according to FIG. 1, when a parking-brake braking specification VP is present, the parking-brake activation device 19 outputs, in an electronic fashion, a parking-brake activation signal S2 to the parking brake control module 18. Within the scope of this parking braking process, just one complete opening process or application process of the spring-loaded brakes 8 is provided here. For example, such a parking-brake control module 18 is described in DE 10 2015 008 377 A1, the content of which is hereby included in its entirety through reference.

Furthermore, the assistance braking specification VA which is specified in an automated fashion can also be transmitted via the CAN bus 20 or the assistance control signal SAss to the parking brake control module 18 and also be implemented by the latter, for example within the scope of a braking function which is specified in an automated fashion or an emergency braking function which is specified in an automated fashion or a parking brake function which is specified in an automated fashion. For this purpose, the parking-brake brake pressure pPH is generated by the parking-brake control module 18 as a function of this assistance braking specification VP which is specified in an automated fashion, and said parking-brake brake pressure pPH applied to the spring-loaded brakes 8, in order also to be able to bring about an assisting braking process during travel, or to bring about parking via the parking brake circuit 7 and the spring-loaded brakes 8 in the stationary state. Within the scope of the above a graduated braking process is also possible in the parking brake circuit 7.

The parking-brake brake pressure pPH which is supplied to the inverter control valve 15 via the third inverter input 17*c*, or a pressure which is associated with said parking-brake brake pressure pPH—is inverted in the inverter control valve 15 via an inverse relay valve 26 (illustrated only schematically in FIG. 1) and output as an inverter control pressure pI to the inverter output 16. The inversion of the parking-brake brake pressure pPH is provided here in order to be able to use the inverter control pressure pI to actuate even service brakes which are applied at high service-brake brake pressures pBa, pBb and open at low service-brake brake pressures pBa, pBb. In contrast, the parking-brake brake pressure pPH is output taking into account the fact that the spring-loaded brakes 8 in the parking brake circuit 7 are applied at low parking-brake brake pressures pPH and open at high parking-brake brake pressures pPH.

Such an inversion function via an inverse relay valve 26 in the inverter control valve 15 is already present in conventional trailer control valves 15*a* which are provided for braking a trailer 200, coupled to the vehicle 100, with service brakes via a parking-brake brake pressure pPH which is applied in the parking brake circuit 7, and accordingly also for braking a targeted fashion the trailer 200 according to the parking-brake braking specification VP or the assistance braking specification VA in a parking situation, an auxiliary braking situation or an emergency braking situation. The inverter output 16 accordingly corresponds to the "yellow coupling head" of a conventional trailer control valve 15*a*. An additional supply pressure output 16V on the trailer control valve 15*a* serves here to transmit the pressure medium from the parking-brake pressure medium reservoir 5*c* to the trailer 200, wherein the reservoir pressure output 16V corresponds to the "red coupling head" of a conventional trailer control valve 15*a*. Accordingly, the inverter control valve 15 can advantageously also be embodied as a conventional trailer control valve 15*a*.

The parking brake control module 18 is connected to a second energy source 11*b* which is independent of the first energy source 11*a*, so that the service brake circuits 2*a*, 2*b* and the parking brake circuit 7 are operated energetically independently of one another. In the event of a failure of the first energy source 11*a*, at least the assistance braking specification VA and the parking-brake braking specification VP can therefore be specified and applied via the parking brake circuit 7 and the inverter control valve 15. The independence of the energy sources 11*a*, 11*b* can be ensured here either by virtue of the fact that energy sources 11*a*, 11*b* which are separate from one another are used or else galvanic isolation occurs between the energy sources 11*a*, 11*b*.

However, in the event of a failure of the first energy source 11*a* or of the electrical components of the service brake circuits 2*a*, 2*b*, i.e. in the event of it being no longer possible to apply a service-brake brake pressure pBa, pBb according to the electrical specification Sa, Sb or by means of the service-brake control module 10 and by means of the pressure modulators 9*a*, 9*b*, the described structure of the electronic brake system 1 according to FIG. 1 also permits implementation of the service-brake braking specification VB as follows, in order to compensate for the failure of the service brake circuits 2*a*, 2*b*:

As already described, in the first fallback level a service-brake braking specification VB which is specified by the driver pneumatically via the service brake valve 13 can be specified, through corresponding switching of the front-axle switching valve 14*a* into the first switching-valve switched position X1, to the pneumatic front-axle redundancy port 12*a* of the front-axle pressure modulator 9*a* and furthermore also directly to the pneumatic rear-axle redundancy port 12*b* of the rear-axle pressure modulator 9*b*. Therefore, in the event of an electrical failure the service-brake braking specification VB specified by the driver can still be brought about redundantly via the service brakes 3 on both vehicle axles 6*a*, 6*b*.

In a second fallback level, which intervenes if the driver is not available when there is an electrical failure of the service brake circuits 2*a*, 2*b*, since said driver is e.g. inattentive, or is not in place when there are relatively highly automated driving maneuvers, the assistance braking specification VA which is specified in an automated fashion can also be implemented by the service brakes 3 on at least one vehicle axle 6*a*, 6*b*. This case can occur, for example, when the vehicle 100 is travelling under automated control, in which case the assistance braking specification VA is specified, for example in the form of the vehicle setpoint deceleration, by the assistance control module 35 via the CAN bus 20.

The automated engagement occurs then by virtue of the fact that when an electrical failure is detected, for example in the first energy source 11*a* or the service-brake control module 10 or the pressure modulators 9*a*, 9*b*, the assistance braking specification VA which is specified in an automated fashion and is to be brought about via the service brake circuits 2*a*, 2*b* is processed by the parking-brake control module 18 instead of by the service-brake control module 10. That is to say the assistance braking specification VA which is transmitted via the assistance control signal SAss or the vehicle setpoint deceleration zSoll is no longer processed, as during normal operation, by the service-brake control module 10 and implemented via the latter by the service brakes 3 in the service brake circuits 2*a*, 2*b*. The electrical failure can be detected here, for example, within the scope of self-diagnostics by the service-brake control module 10, and can be signaled in a corresponding way to the parking-brake control module 18, e.g. via a diagnostics signal SD or a corresponding message on the CAN bus 20.

The parking-brake control module 18 generates the parking-brake brake pressure pPH as a function of the assistance control signal SAss or the specified vehicle setpoint deceleration zSoll and specifies said parking-brake brake pressure pPH to the inverter control valve 15 via the third inverter input 17*c*. Furthermore, the spring-loaded brakes 8 are also supplied with this parking-brake brake pressure pPH so that in the case of redundancy the rear axle 6*b* is braked as a function of the automated assistance braking specification VA. In the inverter control valve 15, the parking-brake brake pressure pPH is output after having been inverted via the inverse relay valve 26 and, if appropriate, increased in terms of air quantity, via the inverter output 16 as an inverter control pressure pI. The inverter control pressure pI is fed via the redundancy pressure line 21 to the second front-axle switching valve input 14*a*2 of the front-axle switching valve 14*a* and as a trailer control pressure pT to a possibly coupled trailer 200. In the second switching-valve switched position X2 of the front-axle switching valve 14*a*, the inverter control pressure pI can therefore be fed as a front-axle redundancy pressure pRa to the pneumatic front-axle redundancy port 12, and via the latter the assistance braking specification VA which is specified in an automated fashion can be effected redundantly on the front axle 6a via the service brakes 3, even without the presence of a driver's request. The inversion in the inverter control valve 15 via the inverse relay valve 26 is also necessary for this, since, in contrast to the parking brake circuit 7, service brakes 3 are actuated in the front-axle service brake circuit 2a.

Therefore, in the second fallback level the implementation of an assistance braking specification VA, specified in an automated fashion, on both vehicle axles 6a, 6b is also possible, wherein the front axle 6a is braked via the service brakes 3, and the rear axle 6b via the spring-loaded brakes 8. In this second fallback level, the parking-brake control module 18 performs here the implementation of the braking which is specified in an automated fashion, wherein the parking-brake brake pressure pPH which follows from the assistance braking specification VA is diverted to the front axle 6a via the inverter control valve 15.

In order to be able to have recourse to the two described fallback levels, corresponding switching of the front-axle switching valve 14a is necessary. According to FIGS. 2a and 2b, the front-axle switching valve 14a can be embodied for this purpose as a shuttle valve 40a (FIG. 2a) or as a 3/2-way valve 40b (FIG. 2b). The two valves 40a, 40b each have two front-axle switching valve inputs 14a1, 14a2 as well as a front-axle switching valve output 14a3 which, as described, are made to extend in a pressure-conducting fashion to the corresponding components of the front-axle brake circuit 2a of the brake system 1. The method of functioning of the illustrated valves 40a, 40b differs as follows:

The shuttle valve 40a, also referred to as "select high valve" passes on the respective higher pressure of the pressures present at the two front-axle switching-valve inputs 14a1, 14a2 to the front-axle switching-valve output 14a3. In the embodiment according to FIG. 1, therefore either the front-axle service-brake control pressure pSa which is output by the service brake valve 13 or the inverter control pressure pI which is output by the inverter control valve 15 is conducted as front-axle redundancy pressure pRa to the pneumatic front-axle redundancy port 12a of the front-axle pressure modulator 9a depending on which of the two pressures pSa, pI is higher.

If a manually specified service-brake braking specification VB by the driver via the service brake valve 13 is present and if this service-brake braking specification VB gives rise to a higher applied pressure value for the front-axle service-brake control pressure pSa than the parking-brake brake pressure pPH which is applied by the parking-brake control module 18 and which is applied on the basis of an assistant braking specification VA which is requested in an automated fashion via the assistance control signal SAss and is conducted as an inverter control signal pI to the shuttle valve 40a, the shuttle valve 40a is switched automatically into the first switching-valve switched position X1, and the manually specified service-brake braking specification VB is implemented on the front axle 6a via the service brakes 3. However, if the driver is attentive or not in place or does not intervene manually in the braking and if automatic braking is requested via the assistance control signal SAss, the front-axle service-brake control pressure pSa is accordingly always lower than the parking-brake brake pressure pPH or the inverter control pressure pI, so that the shuttle valve 40a goes automatically into the second switching-valve switched position X2, and the assistance braking specification VA which is specified in an automated fashion is implemented via the service brakes 3 on the front axle 3.

According to FIG. 2b, the front-axle switching valve 14a is embodied as a 3/2-way valve 40b which can be moved into the respective switching-valve switched position X1, X2 under electrical control via a switching signal SU, and therefore either the first front-axle switching valve input 14a1 (X1) or the second front-axle switching valve input 14a2 (X2) is connected to the front-axle switching-valve output 14a3. The switching-signal SU can be generated and output, for example, by the parking-brake control module 18, in order to specify the switching-valve switched position X1, X2 electrically.

Figure 2A:
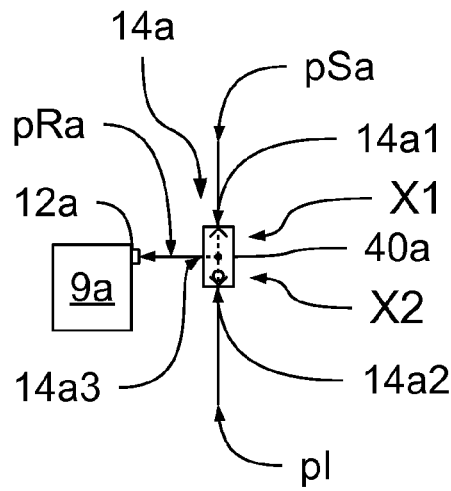
FIGS. 2*a, b, c, d, e* show various embodiments of switching valves in a brake system according to FIG. 1.
Figure 2B:
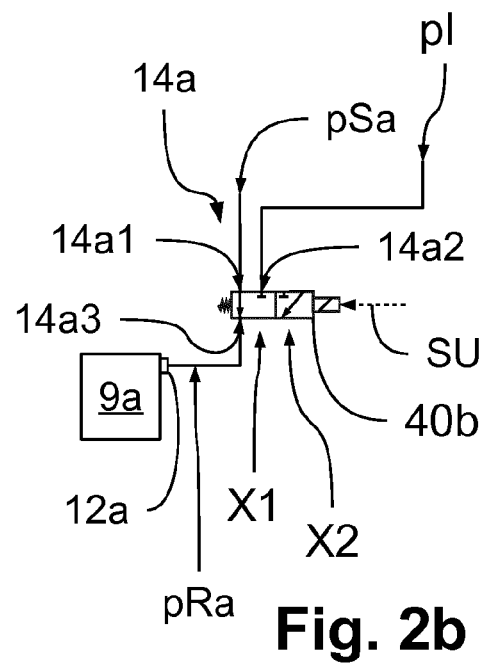
Figure 2C:
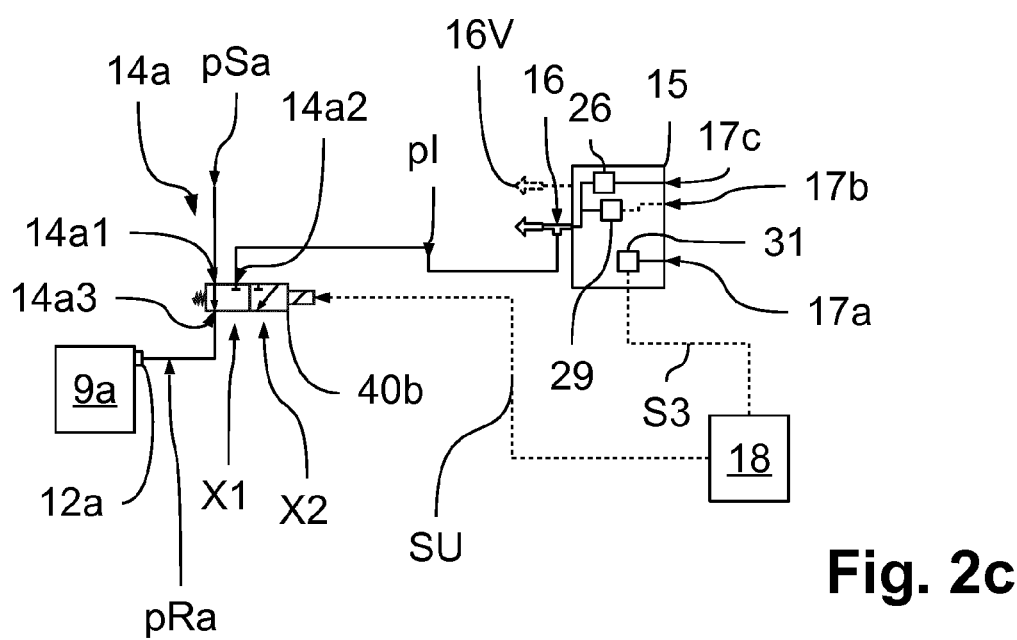

According to one embodiment which is illustrated in FIG. 2c, there can be provision to arrange e.g. in the inverter control valve 15—if appropriate also directly on the service brake valve 13—a pressure sensor 31 which measures the front-axle service-brake control pressure pSa specified to the first inverter input 17a, and accordingly detects whether a service-brake braking specification VB by the driver is present. The pressure sensor 31 outputs a braking request signal S3, for example, to the parking-brake control module 18 for processing, and the parking-brake control module 18 subsequently outputs a corresponding switching signal SU which switches the 3/2-way valve 40b into the first switching position X1 if a service-brake braking specification VB which is present is signaled via the braking request signal S3, so that the service-brake braking specification VB which is pneumatically specified by the service brake valve 13 is conducted from the 3/2-way valve 40b to the front-axle redundancy port 12a, and is converted by the front-axle pressure modulator 9a into a corresponding front-axle service-brake brake pressure pBa.

With the switching valves 40a, 40b which are disclosed in FIGS. 2a, 2b, 2c it is therefore possible to specify in an automated or actively controlled fashion in the brake system 1 according to FIG. 1 which front-axle redundancy pressure pRa is present at the pneumatic front-axle redundancy port 12a and accordingly which redundant braking is to be implemented on the front axle 6a via the service brakes 3: the service-brake braking specification VB or the assistance braking specification VA which is specified in an automated fashion.

The shuttle valve 40a here has the advantage that in any situation the driver can automatically override the assistance braking specification VA which is specified in an automated fashion via the inverter control valve 15, so that the service-brake braking specification VB, i.e. a braking process which is requested by the driver, can always be given a higher priority in comparison with a braking process which is requested in an automated fashion if the driver requests stronger braking. This higher priority can also be allocated an actively controlled 3/2-way valve 40b in the exemplary embodiments illustrated in FIG. 2c in that, when a driver braking process is present and is sensed e.g. via the pressure sensor 31, switching over into the first switching-valve switched position X1 takes place via the switching signal SU. However, such switching with the 3/2-way valve 40b occurs only if particularly stronger braking is not already implemented at the respective time in the second switching-valve switched position X2. In order to avoid bringing about an unsafe driving state or some other kind of dangerous situation as a result of the switching, the other braking process is firstly ended in an uncontrolled fashion, and only then is switching over into the first switching-valve switched position X1 carried out.

Figure 2E:
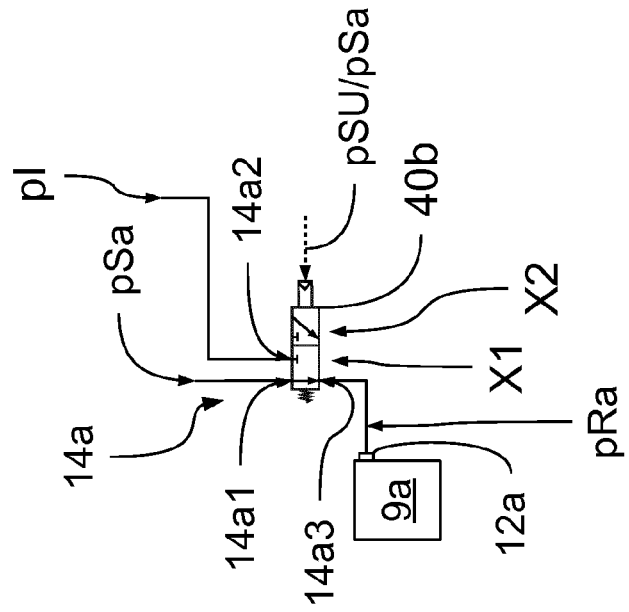
Figure 2D:
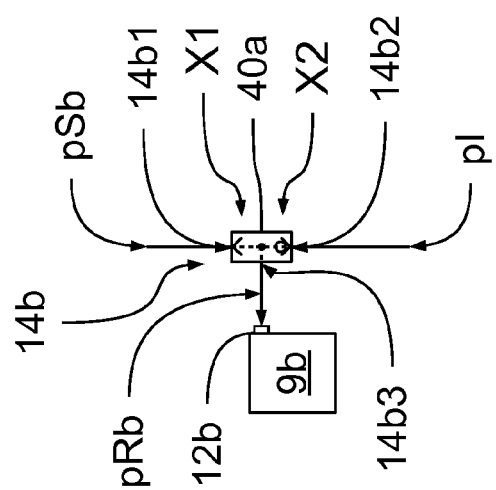

Such a switching valve 40a, 40b—as is illustrated in FIG. 2d as representative of the shuttle valve 40a—can basically also be arranged upstream on the rear axle 6b or on the pneumatic rear-axle redundancy port 12b, in order also to detect the rear-axle redundancy pressure pRb as a function of the driver's request VB or according to the assistance braking specification VA if an electrical failure occurs. Accordingly, a rear-axle switching valve 14b is provided with a first rear-axle switching-valve input 14b1 and a second rear-axle switching-valve input 14b2 which, depending on the switching-valve switched position X1, X2, conduct the rear-axle service-brake control pressure pSb or the inverter control pressure pI to a rear-axle switching-valve output 14b3.

The structural configuration in the electrically controlled brake system 1 is in this case comparable with an arrangement on the front axle 6a, so that the redundant actuation via the rear-axle switching valve 14b can take place in an analogous fashion. When a rear-axle switching valve 14b is used, all that has to be ensured is that in the respective fallback levels the spring-loaded brakes 8 are not applied by the parking-brake control module 18 at the same time as the service brakes 3 on the rear axle 6b, in order to avoid bringing about a superimposed braking effect on the rear axle 6b as a result of the simultaneous activation of the two brakes 3, 8 on the rear axle 6b. This can be done, for example by means of a corresponding open-loop and closed-loop control process in the parking-brake control module 18 in that, for example, outputting of the parking-brake brake pressure pPH to the spring-loaded brakes 8 is prevented if an electrical failure has occurred in the service brake circuits 2a, 2b and redundant actuation of the service brakes 3 on the rear axle 6b is to take place via the inverter control valve 15.

According to FIG. 2e, a pneumatically controllable 3/2-way valve 40b is illustrated by way of example as a front-axle switching valve 14a. A switching control pressure pSU can be fed to said 3/2-way valve 40b pneumatically, said switching control pressure pSU being provided by means of the front-axle service-brake control pressure pSa or a pressure which is proportional thereto. The first switching-valve switched position X1 can be set as a function of the level of the switching control pressure pSU to output the driver's request as a redundant braking request to the respective service brake circuit 2a, 2b.

Figure 3:
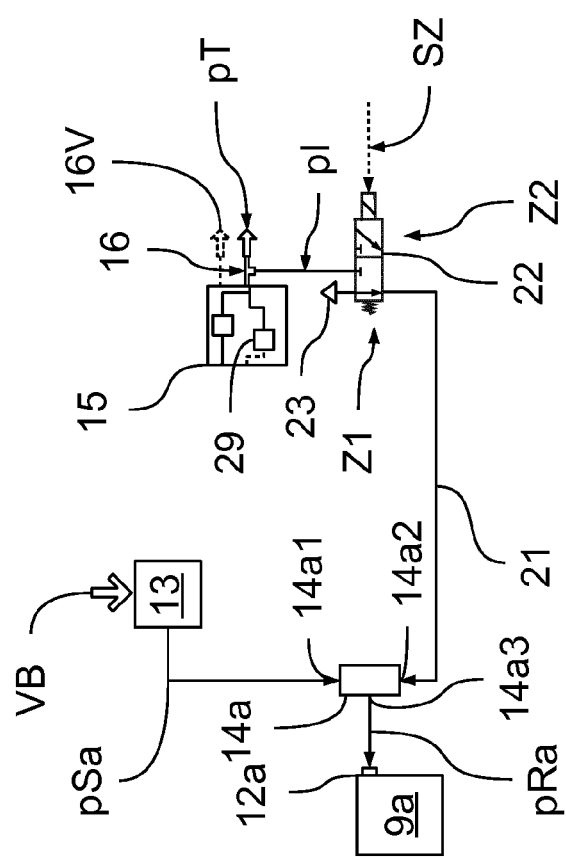
FIG. 3 shows the brake system according to FIG. 1 with a shutoff valve for implementing a shutoff function.

According to FIG. 3, a further embodiment of the brake system 1 is illustrated, wherein in addition a shutoff valve 22 is provided which is arranged in the redundancy pressure line 21 between the inverter control valve 15 or the inverter output 16 and the front-axle switching valve 14a. For the sake of clarity, only the relevant part of the brake system 1 is illustrated in order to clarify the function of the additional shutoff valve 22. All the further components of the brake system 1 are identical to the embodiment shown in FIG. 1.

The shutoff valve 22 is embodied as an electrically controllable 3/2-way valve which can be switched between two shutoff valve switched positions Z1, Z2 as a function of a shutoff signal SZ. In a first shutoff valve switched position Z1 the redundancy pressure line 21 is connected to a bleeding portion 23, so that the inverter control pressure pI is not transmitted from the inverter control valve 15 to the front-axle switching valve 14a. The second front-axle switching-valve input 14a2 is accordingly pressureless. When the front-axle switching valve 14a is switched into the second switching-valve switched position X2, the service brakes 3 on the front axle 6a therefore also remain pressureless and are therefore not applied. Redundant implementation of an assistance braking specification VA, which is specified in an automated fashion, via the service brakes 3 of the front axle 6a in the second fallback level is therefore not possible when the first shutoff-valve switched position Z1 has been set.

In a second shutoff-valve switched position Z2 of the shutoff valve 22, the redundancy pressure line 21 is connected in a pressure-conducting fashion to the inverter output 16, so that, as in the brake system 1 according to FIG. 1, redundant operation according to the above description can take place in that the inverter control pressure pI is also conducted according to the assistance braking specification VA to the front-axle switching valve 14a in the second fallback level.

The respective shutoff-valve switched position Z1, Z2 is specified here by the parking-brake control module 18 via the shutoff signal SZ so that it can be specified whether and when there is to be redundant intervention in the second fallback level. The shutoff function can be advantageous, for example, when the vehicle 100 is shut down for a relatively long time period and accordingly it is not absolutely necessary to brake the vehicle 100 via the front axle 6a, since the vehicle 100 is already kept in a stationary state via the spring-loaded brakes 8 and, if appropriate, the trailer 200. By switching into the first shutoff-valve switched position Z1 in such a situation it is possible, for example to prevent a situation in which, when there are possible leaks in the service brakes 3, the pressure medium can escape if said service brakes 3 are continuously applied with a service-brake brake pressure pBa, pBb in the stationary state.

If the switching valve 14a in FIG. 3 is embodied as a 3/2-way valve 40b, the shutoff function can also already be implemented by means of the switching valve 14a in that in the stationary state or when the vehicle is shutdown for a lengthy time the first switching-valve switched position X1, which corresponds in this case to the first shutoff-valve switched position Z1, is set. Unless there is a driver activation, the first switching valve input 14a1 will accordingly be as it were bled via the service brake valve 13, which corresponds in FIG. 3 to the connection of the redundancy pressure line 21 to the bleeding portion 23. Therefore, in such an embodiment the shutoff function can take place only with the 3/2-way valve 40b as a switching valve 14a unless there is an additional valve.

Figure 4:
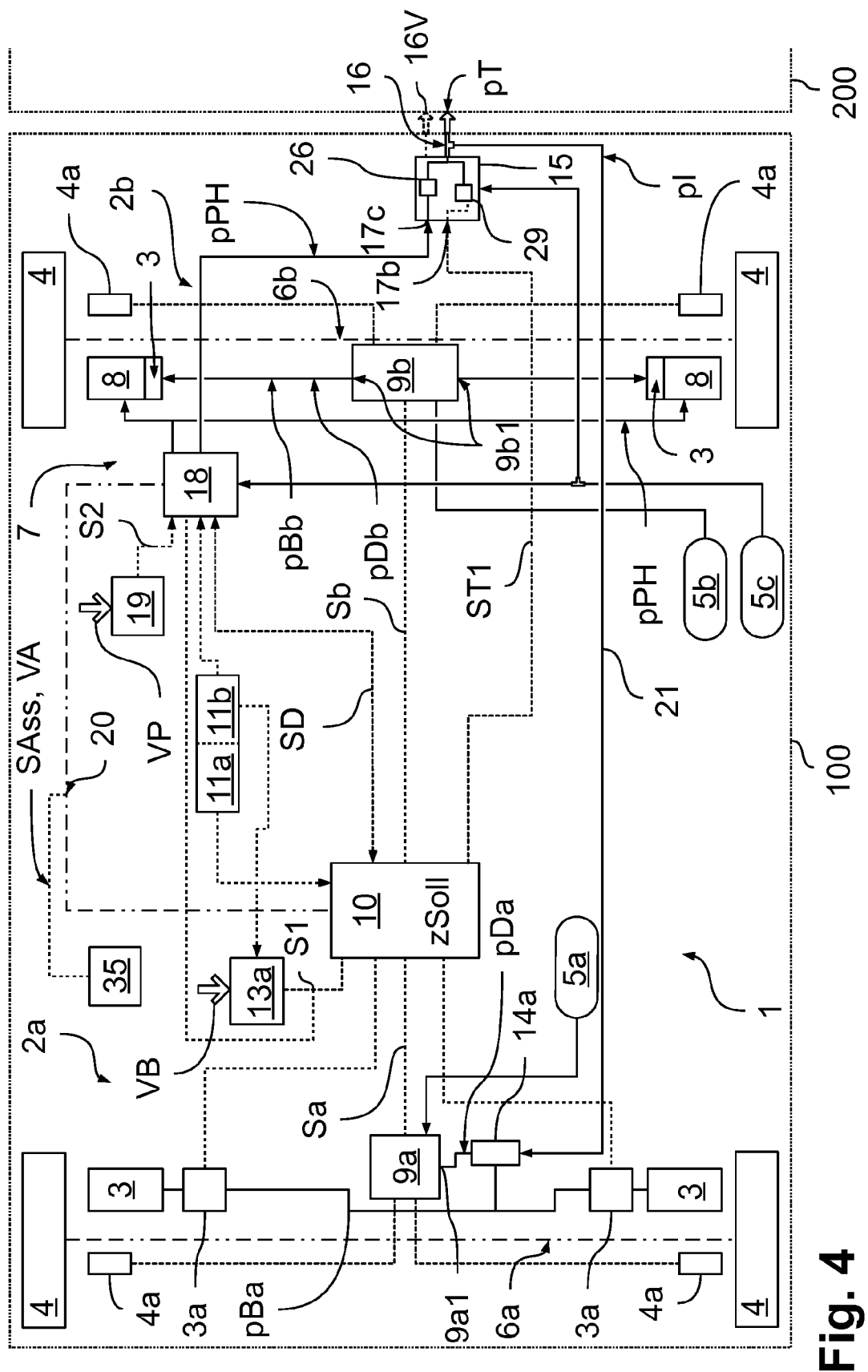
FIG. 4 shows an electronically controllable brake system with an electrically controllable parking brake according to a second embodiment.

According to FIG. 4, a further embodiment of the electronically controllable brake system 1 is illustrated, wherein in contrast to the embodiment in FIG. 1, the pressure modulators 9a, 9b do not have a pneumatic redundancy port 12a, 12b, i.e. a pressure-modulator output pressure pDa, pDb is output in a purely electrically controlled fashion to the respective service brakes 3 by the pressure modulators 9a, 9b. Therefore, it is not possible to form a fallback level by virtue of the fact that in the event of electrical failure a redundancy pressure pRa, pRb is fed to the respective pressure modulator 9a, 9b. Accordingly, the service-brake brake device 13a which is embodied in a purely electrical fashion in this case also does not output a service-brake control pressure pSa, pSb to the respective vehicle axle 6a, 6b, and the service-brake braking specification VB is transmitted by the electric service-brake brake device 13a in a purely electrical fashion via the service-brake activation signal S1. Furthermore, the first inverter input 17a on the inverter control valve 15 is no longer controlled with the front-axle service-brake control pressure pSa.

So that braking via the service brakes 3 can still be made possible in the event of electrical failure, there is provision for the front-axle switching valve 14a to be arranged in the pressure path downstream of the front-axle pressure-modulator output 9a1 of the front-axle pressure modulator 9a. The first front-axle switching-valve input 14a1 of the front-axle switching valve 14a is accordingly connected to the front-axle pressure-modulator output 9a1 so that the front-axle pressure-modulator output pressure pDa which is output by the front-axle pressure modulator 9a is fed to the first front-axle switching-valve input 14a1. As in the embodiment according to FIG. 1, the inverter control pressure pl is present at the second front-axle switching-valve input 14a2 via the redundancy pressure line 21.

Therefore, the brake system 1 according to the previous embodiment is changed in such a way that in the case of redundancy the inverter control pressure pl which is output by the inverter control valve 15 in the second switching-valve switched position X2 is not fed into the front-axle service brake circuit 2a upstream of the front-axle pressure modulator 9a but rather downstream thereof. The inverter control pressure pl is therefore used directly as a front-axle service-brake pressure pBa in the second switching-valve switched position X2. In order to specify an appropriate quantity of air to the service brakes 3 of the front axle 6a in this case, an additional increase in the quantity of air of the inverter control pressure pl can be additionally provided, e.g. via an additional relay valve (not illustrated) in the redundancy pressure line 21.

In the first switching-valve switched position X1 which is set during normal operation, according to FIG. 4, the front-axle pressure-modulator output pressure pDa is used as a front-axle service-brake pressure pBa, i.e. braking which is controlled by the service-brake control module 10 occurs according to the service-brake braking specification VB or according to an assistance braking specification VA which is specified in an automated fashion to the service-brake control module 10. Therefore, the first switching-valve switched position X1 is set on a standard basis, and in the event of an electrical failure in the service brake circuits 2a, 2b, the second switching-valve switched position X2 is switched to.

The first fallback level which in the event of an electronic failure of the first energy source 11a is brought about in the embodiment according to FIG. 1 by virtue of the fact that a service-brake control pressure pSa is output to the pneumatic front-axle redundancy port 12a via the service brake valve 13 and via the front-axle switching valve 14a in the first switching-valve switched position X1 under manual control by the driver is eliminated from this exemplary embodiment according to FIG. 4 since there is no pneumatically controlled redundancy in the pressure modulators 9a, 9b.

A redundant driver intervention on the front axle 6a via the service brakes 3 can, however, occur in this exemplary embodiment by virtue of the fact that the driver specifies a parking-brake braking specification VP manually via the parking-brake activation device 19, and therefore intervenes in the braking process via the parking brake circuit 7 during travel. Via the parking-brake control module 18, this parking-brake braking specification VP is diverted to the inverter control valve 15, and via the redundancy pressure line 21 to the front-axle switching valve 14a, as has already been described with respect to the embodiment according to FIG. 1. The rear axle 6b is braked in this case by specifying the parking-brake brake pressure pPH to the spring-loaded brakes 8, so that both vehicle axles 6a, 6b can continue to be braked in the event of an electrical failure of the service brake circuits 2a, 2b.

Alternatively or additionally, the service-brake activation signal S1 which is output by the electric service-brake brake device 13a—i.e. a manually specified service-brake braking specification VB—can also be additionally transmitted to the parking-brake control module 18, e.g. via a direct connection or via a further (bus) network which differs from the CAN bus 20, so that redundant braking can be brought about on the front axle 6a even in the event of activation of the electrical service-brake brake device 13a via the parking brake circuit 7. The electric service-brake brake device 13a must also be provided redundantly with energy for this purpose by the second energy source 11b, in order to ensure that the service-brake activation signals S1 are output to the parking-brake control module 18 if there is an electrical failure in the service brake circuits 2a, 2b and, at the same time, in particular in the first energy source 11a.

In the exemplary embodiment according to FIG. 4, e.g. the parking-brake control module 18 decides whether the first fallback level (manual parking-brake braking specification VP or service-brake braking specification VB) or the second fallback level (assistance braking specification VA) is to intervene, for example as a function of whether the higher priority is to be allocated to the driver braking specification VB, VP. The second fallback level, in which in the event of an electrical failure of the service brake circuits 2a, 2b an assistance braking specification VA which is requested in an automated fashion is diverted to the service brakes 3 of the front axle 6a via the inverter control valve 15, is, according to this embodiment, essentially identical to the previous embodiments. Only the position of the feeding in of the inverter control pressure pl which is specified by the automated assistance braking specification VA has shifted, as already described.

According to this embodiment, the front-axle switching valve 14a can also be embodied as a shuttle valve 40a or as a 3/2-way valve 40b, as shown in FIG. 2a or FIG. 2b, in order to be able to switch the switching-valve switched position X1, X2 automatically or in an actively controlled fashion. Since in this exemplary embodiment the driver braking specification VB, VP is applied via the parking brake circuit 7, the embodiment according to FIG. 2c, i.e. with an additional pressure sensor 31, is not necessary, since as described above it is already possible to detect and decide in the parking brake control module 18 whether a manually specified driver braking specification VB, VP is present, and whether the latter or the assistance braking specification VA is to be preferably implemented.

Furthermore, in FIG. 4 it is also possible to provide additionally a rear-axle switching valve 14b on the rear axle 6b—as indicated in FIG. 2d—in order to be able to actuate the service brakes 3 on the rear axle 6b via the parking brake circuit 7, in an analogous fashion to those on the front axle 6a, in the event of an electronic failure. The shutoff valve 22 according to FIG. 3, which releases the inverter control pressure pl in the redundancy pressure line 21, can also be used in this embodiment in order, for example, to avoid application of the service brakes 3 on the front axle 6a when the vehicle 100 is shut down for a lengthy period, if this is desired.

Figure 5:
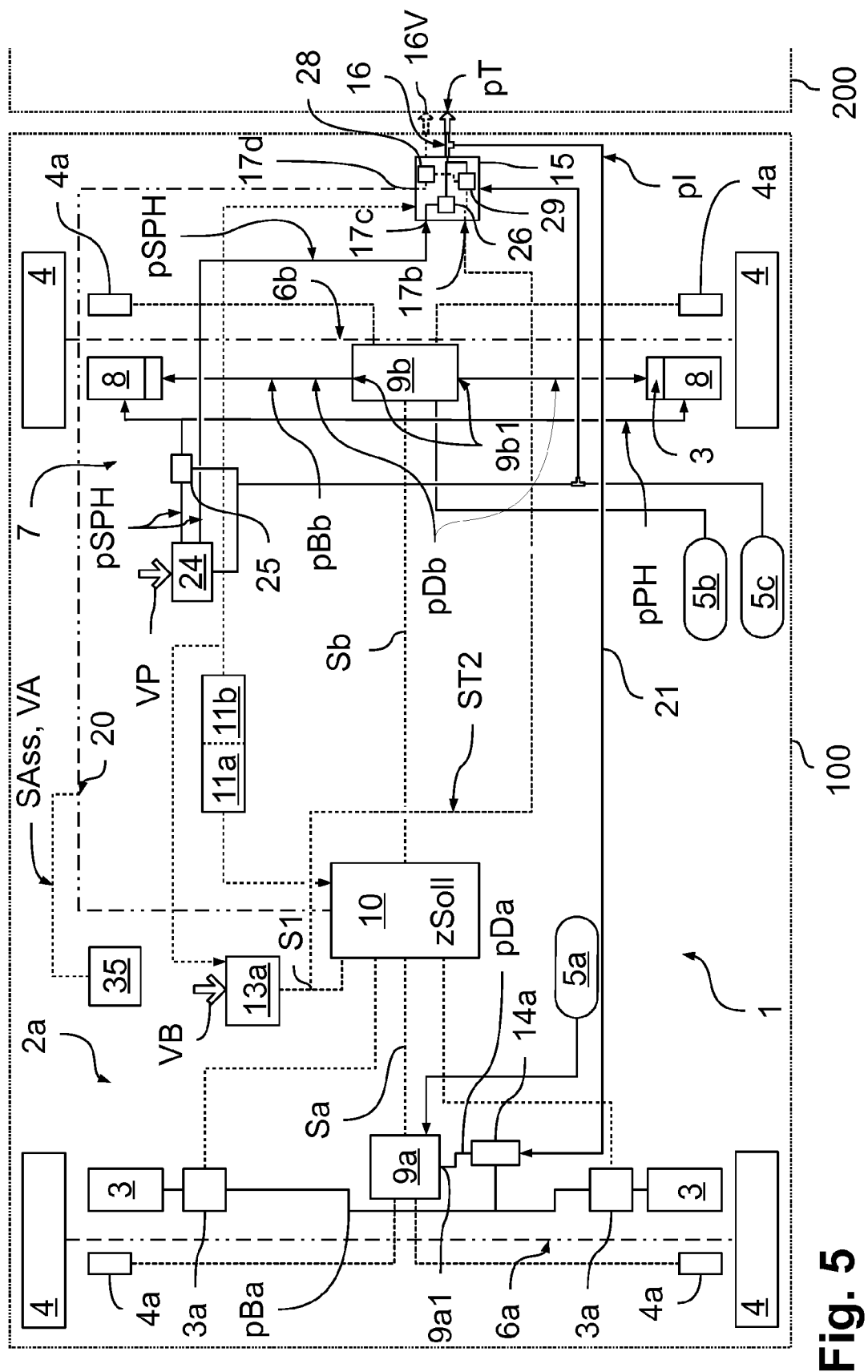
FIG. 5 shows an electronically controllable brake system with a pneumatic controllable parking brake.

According to FIG. 5, a further embodiment of the electrically controllable brake system 1 is illustrated, wherein this embodiment differs from the brake system 1 according to FIG. 4 by virtue of the fact that the parking brake circuit 7 is not formed by an electrically controlled parking brake but rather by a pneumatically controlled parking brake. Accordingly, in this embodiment there is no provision of a parking-brake control module 18 which specifies the parking-brake brake pressure pPH to the inverter control valve 15 and to the spring-loaded brakes 8. In order to be able to bring about a braking operation in this parking brake circuit 7, the driver has to manually specify a parking-brake braking specification VP via a parking brake valve 24 which applies a parking-brake control pressure pSPH, corresponding to the parking-brake braking specification VP, to a relay valve 25. The relay valve 25 ensures that the quantity of air is increased and outputs this parking-brake control pressure pSPH with an increased quantity of air, as a parking-brake brake pressure pPH, to the spring-loaded brakes 8, in order to bring about corresponding braking at the latter.

The parking-brake control pressure pSPH which is output by the parking brake valve 24 or a pressure which is associated therewith is additionally transmitted to the third inverter input 17c of the inverter valve 15, inverted in the inverter control valve 15 by the inverse relay valve 26 and applied to the second front-axle switching-valve input 14a2 of the front-axle switching valve 14a via the inverter output 16, so that, as in the previous exemplary embodiment, the corresponding front-axle service-brake brake pressure pBa is output at the front-axle switching-valve output 14a3 to the service brakes 3 depending on the switching-valve switched position X1, X2. The inverter control pressure pl can, as described, also be increased in respect of quantity of air, in order to be able to apply an appropriate quantity of air to the service brakes 3. Accordingly, the driver can intervene manually in the braking process via the parking brake valve 24, if at least one of the service brake circuits 2a, 2b has failed.

If the service-brake control module 10 has failed, the assistance braking specification VA which is requested in an automated fashion can be implemented in the brake system 1 according to FIG. 5 only via the inverter control valve 15 in that the assistance braking specification VA is transmitted from the CAN bus 20 to said brake system 1 and in this case converted into an inverter control pressure pl via corresponding electronics integrated in the inverter control valve 15 (cf. FIG. 7 or 8c), e.g. an inverter control module 28, and the pilot control module 29 in parallel with the inversion described in FIG. 1. The service-brake braking specification VB which is specified via the electric service-brake brake device 13a can be implemented in the event of an electronic failure, in that, for example, the service-brake braking specification VB is transmitted from the electric service-brake brake device 13a to the second inverter input 17b via a second inverter control signal ST2, for example via a (bus) network or a direct connection or the like, in order to generate the corresponding inverter control pressure pl via the electronics integrated in the inverter control valve 15 (cf. FIG. 7 or 8c), e.g. the inverter control module 28, and the pilot control module 29 in a way analogous to the assistance braking specification VA. The transmission of the first inverter control signal ST1 to the second inverter input 17b is eliminated in this case. In order to permit this even in the case of an electrical failure of the service brake circuits 2a, 2b and, if appropriate, also of the first energy source 11a, the service brake 13 and also the inverter control valve 15 are to be supplied with energy redundantly, e.g. via the second energy source 11b.

According to an embodiment not illustrated FIG. 1 can have, in an analogous fashion to FIG. 5, the parking brake valve 24 instead of the parking-brake activation device 19 and the parking-brake control module 18. That is to say instead of an electric parking brake a pneumatic parking brake is provided in the brake system 1 according to FIG. 1, which pneumatic parking brake can also be used, in a way analogous to that described in FIG. 5, for the redundant operation, in which case the respective switching valve 14a, 14b is arranged, in contrast to FIG. 5, on the respective vehicle axle 6a, 6b, in front of the redundancy ports 12a, 12b which are then present again.

In all the described embodiments it is therefore ensured that in the event of an electrical failure in at least one of the service brake circuits 2a, 2b, i.e. in the event of the pressure modulators 9a, 9b not being able to apply a corresponding service-brake brake pressure pBa, pBb under electrical control by the service-brake control module 10, at least one fallback level is formed in which the service brakes 3 on the front axle 6a and/or on the rear axle 6b are actuated as a function of a parking-brake braking specification VP which is present in the parking brake circuit 7 and is specified manually, or of an assistance braking specification VA which is specified in an automated fashion. If appropriate, a service-brake braking specification VB which is output by the service brake valve 13 can also be present at the parking brake circuit 7. The parking-brake brake pressure pPH which corresponds to the respective braking specification VA, VB, VP and is applied in the parking brake circuit 7 (FIGS. 1 to 4) or the parking-brake control pressure pSPH (FIG. 5) is inverted via the inverter control valve 15 and diverted to the front axle 6a or rear axle 6b, wherein the inversion ensures that if necessary a braking operation via the service brakes 3 brings about approximately the same braking effect as a braking operation with the spring-loaded brakes 8 according to the specified braking specification VA, VB, VP.

Under certain circumstances it may also be appropriate to scale the braking specification VA, VB, VP on an axle basis, i.e. the parking-brake brake pressure pPH is smaller or larger by a factor than the service-brake brake pressure pBa, pBb which is generated as a function thereof. The inverter control pressure pl which is made available by the inverter control valve 15 is output in all exemplary embodiments to the respective vehicle axles 6a, 6b via the respective switching valve 14a, 14b, in order to permit switching between the normal operation and one of the fallback levels or switching between two fallback levels, and therefore to provide the driver with the possibility in a brake system 1 according to for example FIG. 1 in a situation-conditioned fashion of intervening in a braking fashion via the service brake valve 13, wherein, if appropriate, a braking process which has already been carried out in an automated fashion is ended beforehand in a controlled fashion, in order to avoid bringing about an unsafe driving state or a situation which is dangerous in some other way.

Figure 6:
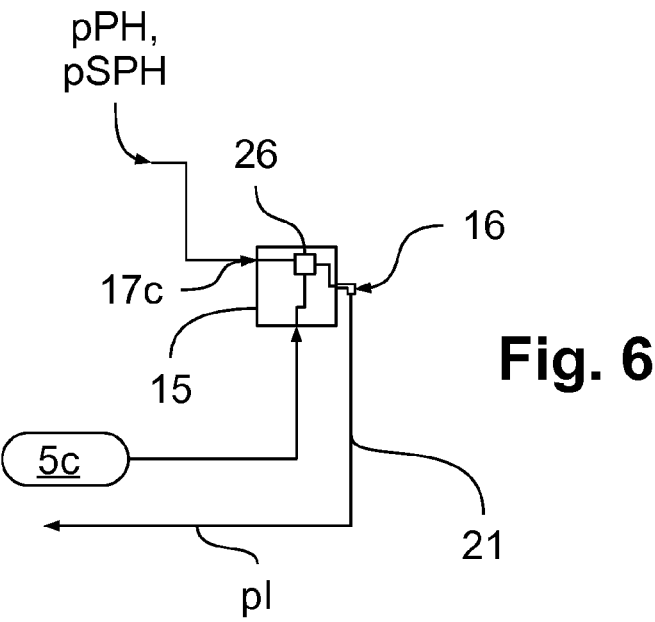
FIGS. 6 and 7 show inverter control valves in alternative embodiments.

In the previous embodiments, the inverter control valve 15 is embodied essentially like a trailer control valve 15a with the corresponding inverter inputs 17a, 17b, 17c and the inverter output 16 which corresponds to the "yellow coupling head", and the supply pressure output 16V, which corresponds to the "red coupling head". However, according to FIG. 6 there can also be provision in the simplest variant that the inverter control valve 15 is composed of only one inverse relay valve 26, to which the parking-brake brake pressure pPH or the parking-brake control pressure pSPH is fed, as described above, via the third inverter input 17c. The inverse relay valve 26 inverts the parking-brake brake pressure pPH or the parking-brake control pressure pSPH correspondingly and outputs the inverter controller pressure pI to the redundancy pressure line 21 via the inverter output 16. The first and the second inverter input 17b, 17c can be eliminated in this exemplary embodiment.

Therefore, in this simplest variant of a known trailer control valve 15a, only the inversion function is transferred into the inverter control valve 15, which is sufficient, for example, when only one redundant braking operation is to take place with the inverter control valve 15, and there is no provision for a trailer 200 to be actuated via said inverter control valve 15. Optionally, further functionalities which make up the redundant braking mode can gradually be implemented via an additional control module and further inverter inputs.

Figure 7:
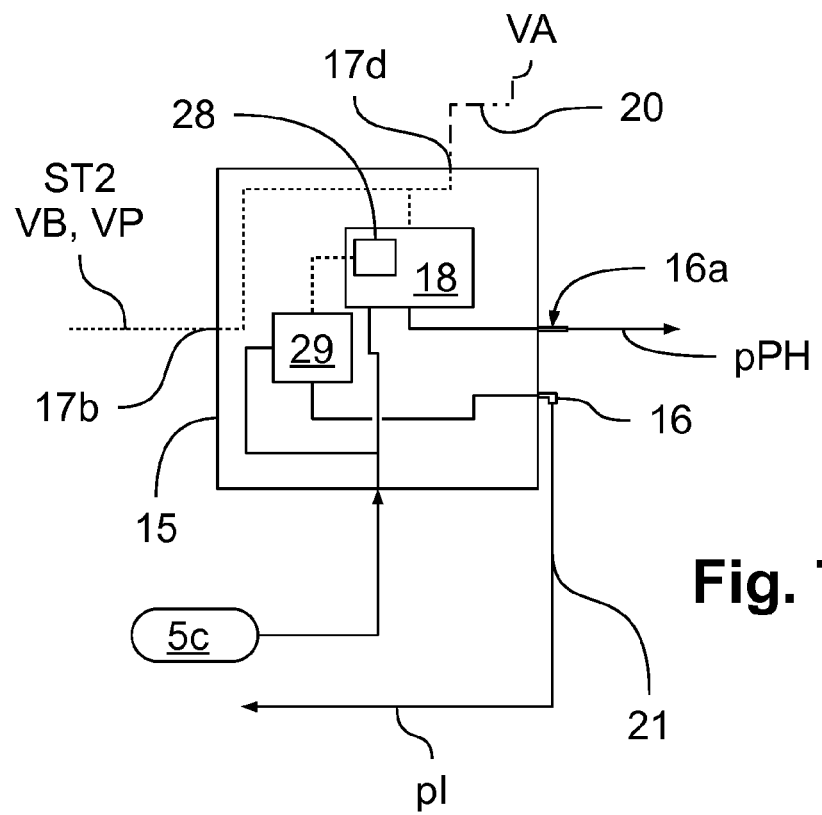

In a purely electrically controlled variant of the inverter valve 15 which is illustrated in FIG. 7 there can be provision for the inverter control pressure pl to be generated in a purely electronic fashion, i.e. for the inversion to be carried out electronically. For this purpose, the parking brake control module 18 is arranged in the inverter control valve 15, and the parking-brake braking specification VP or the parking-brake activation signal S2 and/or the service-brake braking specification VB or the service-brake activation signal S1 is fed to the inverter control valve 15 via the second inverter input 17b or an additional inverter input, via the second inverter control signal ST2 which is transmitted via a (bus) network which differs from the CAN bus 20 or via a direct connection from the service brake valve 13 or the electrical service-brake activation device 13a and/or by the parking-brake activation device 19. Furthermore, the assistance braking specification VA or the assistance control signal SAss which is transmitted in the vehicle 100 via the CAN bus 20 can be fed via a fourth inverter input 17d. The parking-brake control module 18 generates the parking-brake brake pressure pPH as a function of one of these braking specifications VA, VB, VP and outputs said parking-brake brake pressure pPH and to the spring-loaded brakes 8 via an additional parking-brake output 16a on the inverter control valve 15. The pilot control module 29 in the inverter control valve 15 generates, under control by the inverter control module 28 integrated into the parking-braking control module 18, an inverter control pressure pl, which is inverse with respect to the parking-brake brake pressure pPH, as a function of the respective braking specification VA, VB, VP, which inverter control pressure pl is output to the respective switching valve 14a, 14b via the output 16 in order to implement the braking process for with the service brakes 3.

Figure 8A:
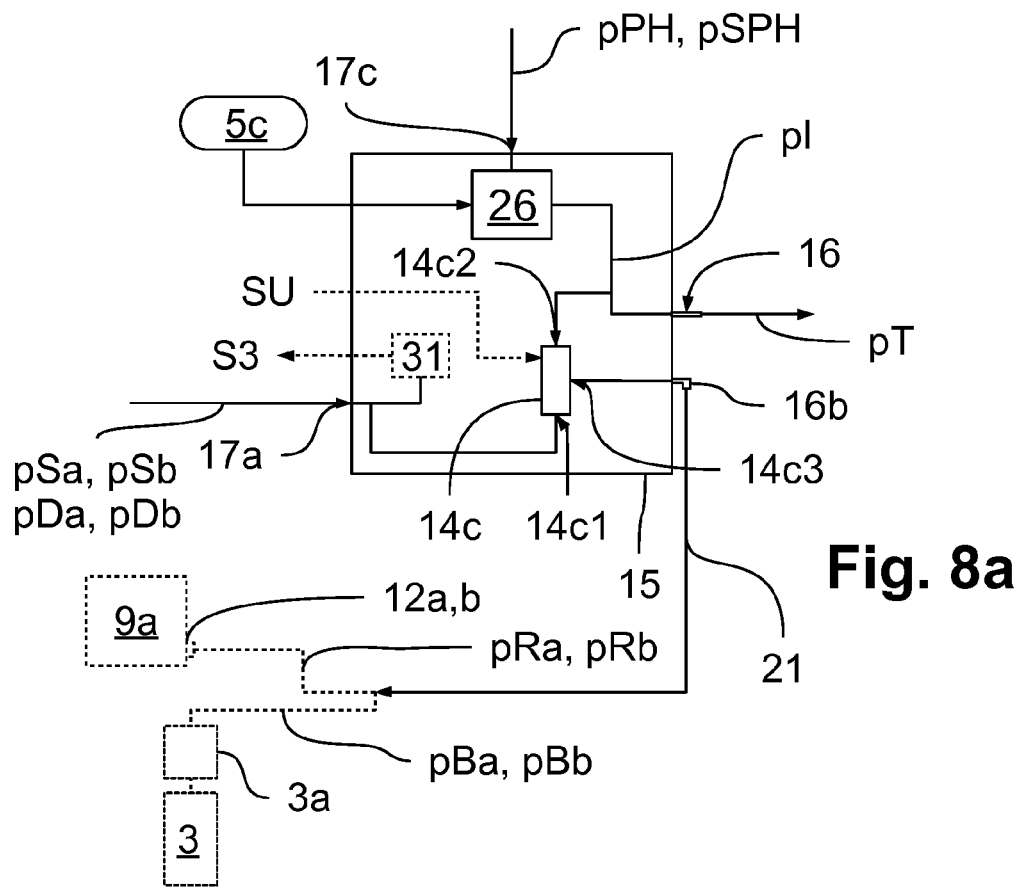
FIGS. 8*a, b, c* show inverter control valves with an integrated switching valve in different embodiments.
Figure 8B:
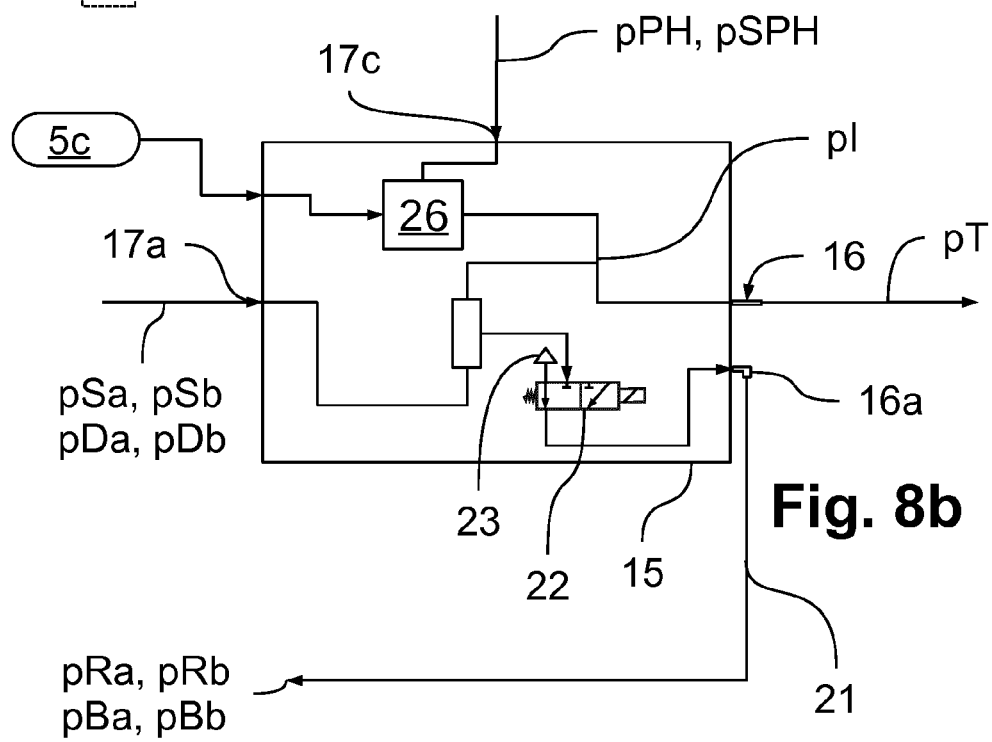
Figure 8C:
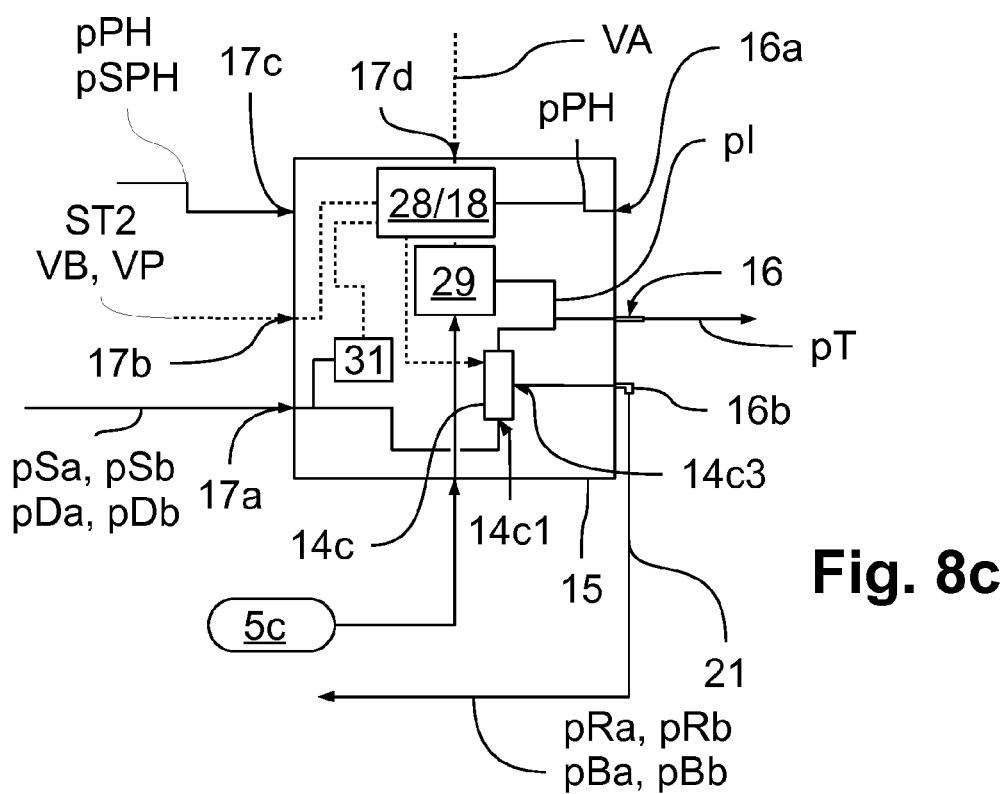

According to further embodiments of the inverter control valve 15 which are illustrated in FIGS. 8a, 8b and 8c, an inverter switching valve 14c is integrated in the inverter control valve 15, wherein the inverter switching valve 14c performs the same task and functionality as the switching valves 14a, 14b, specified in the preceding exemplary embodiments, on the respective vehicle axle 6a, 6b. The inverter switching valve 14c can be embodied here, as also in the preceding embodiments, as a shuttle valve 40a (see FIG. 2a) or as an electrically controllable 3/2-way valve 40b (see FIGS. 2b and 2c). For the sake of clarity, to a certain extent only the components in the inverter control valve 15 which differ from the previous embodiments are illustrated in FIGS. 8a to 8c.

According to FIG. 8a, there is accordingly provision to specify, to the inverter switching valve 14c via a first inverter switching-valve input 14c1, the service-brake control pressure pSa, pSb which is applied by the service brake valve 13 on the basis of the service-brake braking specification VB, said service-brake control pressure pSa, pSb being preferably the front-axle service-brake control pressure pSa which, as in the brake system 1 according to FIG. 1, can be transmitted to the inverter control valve 15 via the first inverter input 17a, in order to brake the trailer 200 as a function of the front-axle service-brake control pressure pSa. Alternatively, there can be provision, for the brake system 1 according to FIG. 4 in which a service-brake control pressure pSa, pSb is not specified by the in this case purely electric service-brake activation device 13a, that the pressure-modulator output pressure pDa, pDb which is generated by the respective pressure modulator 9a, 9b on the basis of the respective service-brake control signal Sa, Sb, is conducted to the first inverter input 17a of the inverter control valve 15, and said pressure-modulator output pressure pDa, pDb is specified to the first inverter switching-valve input 14c1.

The inverter control pressure pl which is generated by the inverse relay valve 26 in the inverter control valve 15 from the parking-brake pressure medium reservoir 5c is specified to a second inverter switching-valve input 14c2 of the inverter switching valve 14c. The inverse relay valve 26 generates the inverter control pressure pl according to this embodiment as a function of the parking-brake brake pressure pPH which is present at the third inverter input 17c (cf. FIG. 1 and FIG. 4) or parking-brake control pressure pSPH (see FIG. 5) by inversion, as described already with respect to the other exemplary embodiments. The generated inverter control pressure pl is subsequently transmitted to the second inverter switching-valve input 14c2 as well as also to the inverter output 16—i.e. the "yellow coupling head" of a trailer control valve 15a—in order to be able to specify the latter as a trailer control pressure pT to a brake system with service brakes in the coupled trailer 200.

Depending on the switching-valve switched position X1, X2, the pressures pl, pSa, pSb, pDa, pDb which are present at the inverter switching-valve inputs 14c1, 14c2, are optionally output to an inverter switching-valve output 14c3 of the inverter switching valve 14c according to the system described above, i.e. in an automated fashion via the shuttle valve 40 or under active control via the 3/2-way valve 40b. The inverter switching-valve output 14c3 is connected to an additional redundancy output 16b of the inverter control valve 15, which, in this embodiment is provided for outputting the pressure pl, pSa, pSb, pDa, pDb, optionally output by the inverter switching-valve output 14c3, for the actuation of the service brakes 3 via the pressure modulator 9a, 9b. In this embodiment of the inverter control valve 15, for this purpose the redundancy pressure line 21 is connected to the redundancy output 16b, in order to ensure that the pressure pl, pSa, pSb, pDa, pDb which is optionally output is fed via the latter into the at least one service brake circuit 2a, 2b.

The position of the feeding via the redundancy pressure line 21 is selected here as follows:

If specification of the service-brake control pressure pSa, pSb, preferably of the front-axle service-brake control pressure pSa, is provided via the first inverse input 17a of the inverter control valve 15, the redundancy pressure line 21 is to be connected directly to the redundancy port 12a, 12b of the respective pressure modulator 9a, 9b, preferably of the front-axle pressure modulator 9a, in order to use as the redundancy pressure pRa, pRb the pressure which is output at the redundancy output 16b of the inverter control valve 15—i.e. either the inverter control pressure pl or the respective service-brake control pressure pSa, pSb. If, on the other hand, the pressure-modulator output pressure pDa, pDb is specified to the first inverter input 17a, the redundancy pressure line 21 is to be connected directly to the service brakes 3, in order to use the pressure present at the redundancy output 16b—i.e. either the inverter control pressure pl or the pressure-modulator output pressure pDa, pDb—as the service-brake brake pressure pBa, pBb to actuate the service brakes 3. Only one service brake 3 is illustrated in FIG. 8a for the sake of clarity.

Depending on whether only one of the vehicle axles 6a, 6b is to be redundantly braked via the corresponding service brake circuit 2a, 2b as a function of the inverter control pressure pI in the redundant braking mode, the redundancy pressure line 21 can also only ensure that the inverter control pressure pI is fed into one of the service brake circuits 2a, 2b. The service brake circuit 2a, 2b or the respective other service brake circuits 2a, 2b can then not be braked redundantly by means of the braking specification, derived from the inverter control valve 15, on the basis of the parking brake circuit 7.

The respective switching-valve switched position X1, X2 of the inverter switching valve 14c is set, depending on the design, automatically in the case of a shuttle valve 40a or actively controlled via the switching signal SU in the case of the 3/2-way valve 40b, as has already been described with respect to the previous embodiments. The switching signal SU can advantageously occur here as a function of the measurement of the pressure sensor 31 indicated in FIG. 8a, as also in the exemplary embodiment according to FIG. 2c. That is to say in the parking-brake control module 18 it is evaluated on the basis of the braking request signal S3 whether a manually specified service-brake braking specification VB is present, and on the basis thereof the inverter switching valve 14c which is embodied in this case as a 3/2-way valve 40b, is actuated and switched into the corresponding switching-valve switched position X1, X2.

The evaluation of the pressure sensor 31 and the following outputting of the switching signal SU is, as already described above, advantageous only when it concerns a brake system 1 which is comparable with FIG. 1, i.e. a service-brake control pressure pSa, pSb is specified via the first inverter input 17a. If a service-brake braking specification VB is accordingly generated by the driver via the service brake valve 13 and if an electrical failure has occurred in the service brake circuits 2a, 2b, the service-brake control pressure pSa, pSb is present at the first inverter input 17a, which can be measured by the pressure sensor 31. Subsequently, the inverter switching valve 14c is actively switched into the first switching-valve switched position X1 via the switching valve SU, so that the service-brake control pressure pSa, pSb can be output, as a redundancy pressure pRa, pRb, to the respective redundancy port 12a, 12b of the respective pressure modulator 9a, 9b in accordance with the service-brake braking specification VB. As a result, it is possible to have recourse to the first fallback level according to the above description. A braking process VA which has possibly been requested beforehand in an automated fashion in the second fallback level via the parking-brake brake circuit 7, i.e. in the second switching-valve switched position X2, is accordingly aborted in a controlled fashion.

In the brake system 1 according to FIG. 4, a service-brake control pressure is not specified, and in the event of an electrical failure a pressure-modulator output pressure pDa, pDb is also not applied, so that the pressure sensor 31 would not measure anything. However, the switching signal SU can be generated by the parking-brake control module 18 on the basis of a detected electrical failure in the at least one service brake circuit 2a, 2b and output, in order to correspondingly set the inverter switching valve 14c so that the pressure sensor 31 is not necessary.

According to FIG. 8b, in addition to the inverter switching valve 14c the shutoff valve 22 is also integrated into the inverter control valve 15, in order to be able to implement, according to the embodiment in FIG. 3, a shutoff function which is of identical design according to this embodiment and defines, as a function of the shutoff valve switched position Z1, Z2, whether or not in the second switching-valve switched position X2 the inverter control pressure pI—and here also the service-brake control pressure pSa, pSb or the pressure-modulator output pressure pDa, pDb in the first switching-valve switch position X1—are transmitted to the respective service brake circuit 2a, 2b via the redundancy pressure line 21. In the case of a service-brake braking specification VB which is specified manually by the driver, there is preferably provision here on a standard basis for the second shutoff-valve switched position Z2 to be set to be able to implement the driver's braking request in any case via the service brake circuits 2a, 2b, irrespective of an electrical failure in the service brake circuits 2a, 2b. If the inverter switching valve 14c is embodied as a 3/2-way valve 40b, the shutoff function, as has already been described above with respect to FIG. 3, can also be brought about by means of the inverter switching valve 14c instead of via the shutoff valve 22 by means of corresponding actuation.

The structural refinements of the inverter control valve 15 according to FIGS. 8a and 8b therefore ensure that it is no longer necessary to position switching valves 14a, 14b or a shutoff valve 22 on the respective axles 6a, 6b, but rather an integrated compact solution can be installed in the vehicle 100. As a result, simple retrofittability and low space requirement on the vehicle axle 6a, 6b can be achieved, since the relevant components are located essentially in the inverter control valve 15 and can therefore easily be subsequently installed in one working step, e.g. instead of a conventional trailer control valve 15a. Accordingly, only the redundancy pressure line 21 has to be newly laid to the inverter control valve 15.

According to FIG. 8c, it is possible to provide, in a way comparable with the embodiment in FIG. 7, for the corresponding braking specification VA, VB, VP to be transmitted electrically to the inverter control valve 15. For this purpose, the assistance braking specification VA which is specified in an automated fashion is transmitted from the CAN bus 20 (fourth inverter input 17d) or the service-brake/parking-brake braking specification VB, VP via a direct connection or a further (bus) network (second inverter input 17b) via the second inverter control signal ST2 to the inverter control valve 15. In the inverter control valve 15, the inverter control pressure pI is generated from the respective braking specification VA, VB, VP via the pilot control module 29 under control by the inverter control module 28 and is output to the second inverter switching-valve input 14c2 of the inverter switching valve 14c. Alternatively or additionally it is possible, as also described with respect to FIG. 7, for the parking-brake control module 18 to be integrated, together with the inverter control module 28, into the inverter control valve 15, and then with a corresponding parking brake output 16a for outputting the parking-brake brake pressure pPH which is generated therein.

The generation of the inverter control pressure pI, which is inversely proportional to a parking-brake brake pressure pPH which can be implemented in the parking brake circuit 7 on the basis of the respective braking specification VA, VB, VP, or parking-brake control pressure pSPH, is therefore also achieved again here by means of electronic actuation of the pilot control module 29. In this context the pressure sensor 31 is particularly preferably integrated into the inverter control valve 15, in order to detect the driver's request and switch the inverter switching valve 14c correspondingly in a situation-dependent fashion via the inverter control module 28, integrated into the inverter control valve 15, or parking-brake control module 18.

In addition, it is also possible to arrange an inverse relay valve 26 (not illustrated) in the inverter control valve 15 according to FIG. 8c, in order when necessary to be able to invert the parking-brake control pressure pSPH, specified via the third inverter input 17c, or parking-brake brake pressure pPH, as described with respect to the previous exemplary embodiments, so that further redundancy can be formed. This is the case if the parking-brake control module 18 is not integrated into the inverter control module 15 but rather only the inverter control module 28 or a pneumatic parking brake according to FIG. 4 or 5 is provided, and accordingly, inversion which is controlled in a non-electrical fashion is required.

Figure 9:
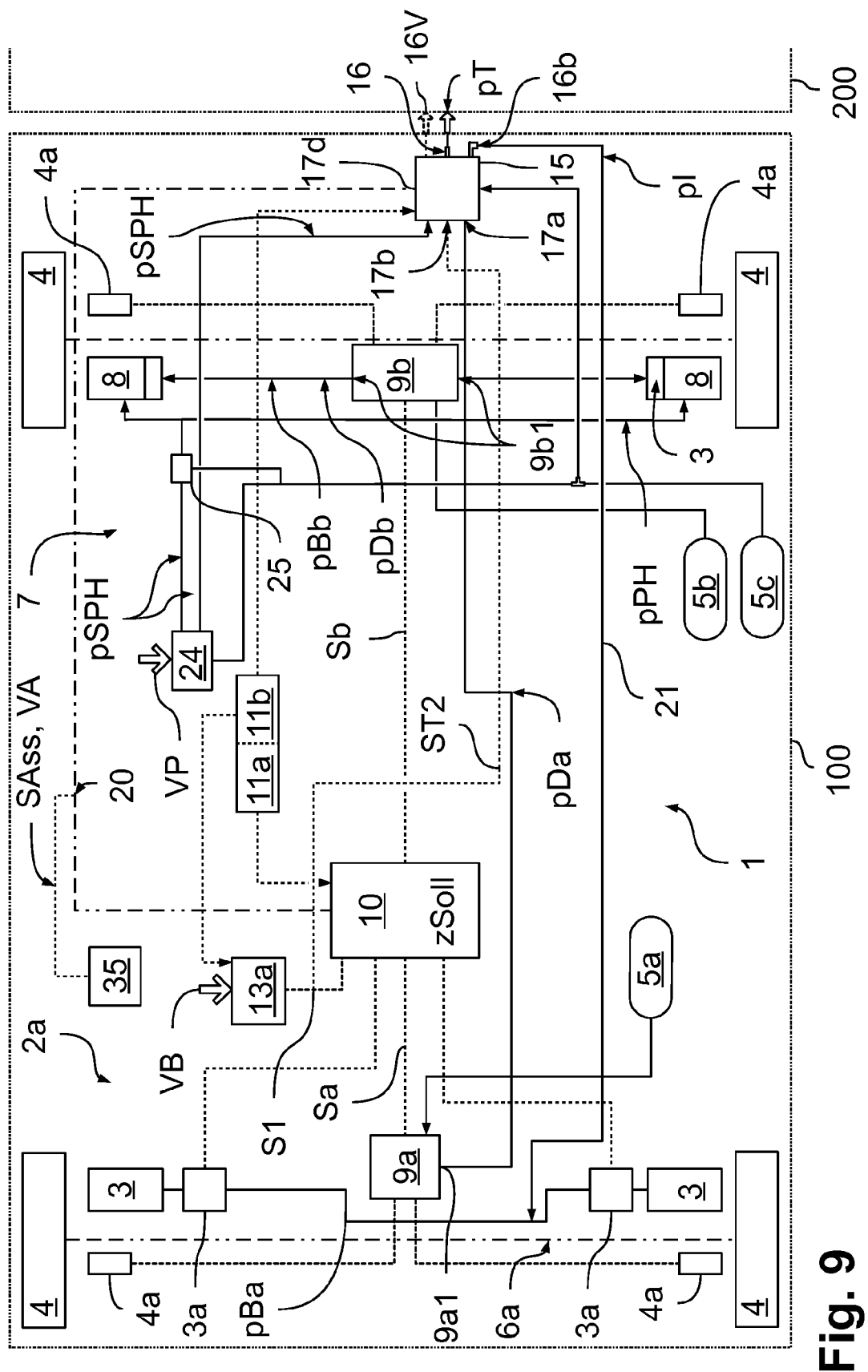
FIGS. 9 and 10 show electronically controllable brake systems according to further embodiments with an inverter control valve according to FIG. 8*c*.

The variant of the inverter control module 15 according to FIG. 8c can be used for a pneumatic parking brake, i.e. with an integrated inverter control module 28 without an integrated parking-brake control module 18 and with feeding of the parking-brake control pressure pSPH via the third inverter input 17c and without a parking-brake output 16a, for example in a brake system 1 illustrated in FIG. 9. Accordingly, the front-axle pressure-modulator output pressure pDa is transmitted to the inverter control valve 15 via the first inverter input 17a, and here the second inverter control signal ST2 is transmitted, with a service-brake braking specification VB which s specified electrically by the service brake valve 13, via the second inverter input 17b, and the assistance braking specification VA which is requested in an automated fashion is transmitted to the inverter control valve 15 via the fourth inverter input 17d.

In the inverter control valve 15, the respective electrically transmitted braking specification VA, VB is converted, under control by the inverter control module 28, by the pilot control module 29 into an inverter control pressure pl in order to output the latter both as a trailer control pressure pT to a trailer 200 via the inverter output 16, and depending on the switching-valve switched position X1, X2 of the inverter switching valve 14c to the front-axle service brake circuit 2a via the redundancy output 16b and the redundancy pressure line 21. By means of the service-brake braking request VB being transmitted via the second inverter control signal ST2 it is therefore also possible to transmit it to the trailer 200 as a trailer control pressure pT.

The inverter control module 18 which is integrated in the inverter control valve 15 can define here whether the braking specifications VA, VB, VP which are specified electrically via the fourth inverter input 14d or the second inverter input 14b are to be implemented, or the braking specification specified in the form of the front-axle pressure-modulator output pressure pDa is to be implemented via the first inverter input 17a. This can take place either by means of active actuation of the inverter switching valve 14c which is embodied in this case as a 3/2-way valve 40b, in particular as a function of the braking-request signal S3 which is output by the pressure sensor 31, and/or by virtue of the fact that when there is a corresponding braking request signal S3 a low inverter control pressure pl is generated by the pilot control module 29 by controlled ending of the braking process which has already been specified and requested in an automated fashion, and in the case of an inverter switching valve 14c which is embodied as a shuttle valve 40a this leads to a situation in which the latter is switched automatically into the first switching-valve switched position X1, and as a result the front-axle service-brake control pressure pSa is applied by the inverter control valve 15 via the redundancy output 16b.

The parking-brake control pressure pSPH which is also output to the spring-loaded brakes 8 by the parking brake valve 24, or a pressure which is associated with said parking-brake control pressure pSPH, is also transmitted via the third inverter input 17c to the inverter control valve 15 in order, when necessary, also to permit inversion via the installed inverse relay valve 26 (not illustrated for the sake of clarity) in the inverter control module 15, and to output the inverter control pressure pl, generated redundantly via the latter, to the redundancy output 16b so that further redundancy can be formed.

This can ensure that in a brake system 1 with a pneumatic parking brake an assistance braking specification VA, requested in an automated fashion, can also be transmitted via the inverter control valve 15, and the inverter switching valve 14c can be transmitted to the front-axle service brake circuit 2a, if an electrical failure has occurred in the latter and the assistance braking specification VA therefore cannot be applied directly to the front-axle service brake circuit 2a via the service-brake control module 10. This is advantageous, in particular, even when the driver does not intervene himself via a manual braking specification VB, VP when there is an electrical failure, and said braking specification VB, VP is therefore not transmitted redundantly to the front-axle service brake circuit 2a via the inverter control valve 15.

In an analogous fashion, specification, in a certain electrically controlled fashion, of the inverter control pressure pl via the inverter control valve 15 can also be ensured in a brake system 1 in a way comparable e.g. with FIG. 5, in that the switching valves 14a, 14b are not arranged in the inverter control valve 15 but on the respective vehicle axle 6a, 6b. Accordingly, in FIG. 5 it is also possible to additionally provide for the pilot control module 29 to be activated in the inverter control valve 15 via the inverter control module 28 which is integrated in the inverter control valve 15 or via an external control module, in order, in the event of an electrical failure of the service brake circuits 2a, 2b, to be able to divert the assistance braking specification VA to the service brake circuits 2a, 2b via the inverter control valve 15 and the respective switching valve 14a, 14b and therefore be able to bring about in the case of redundancy a braking process which is requested in an automated fashion.

Figure 10:
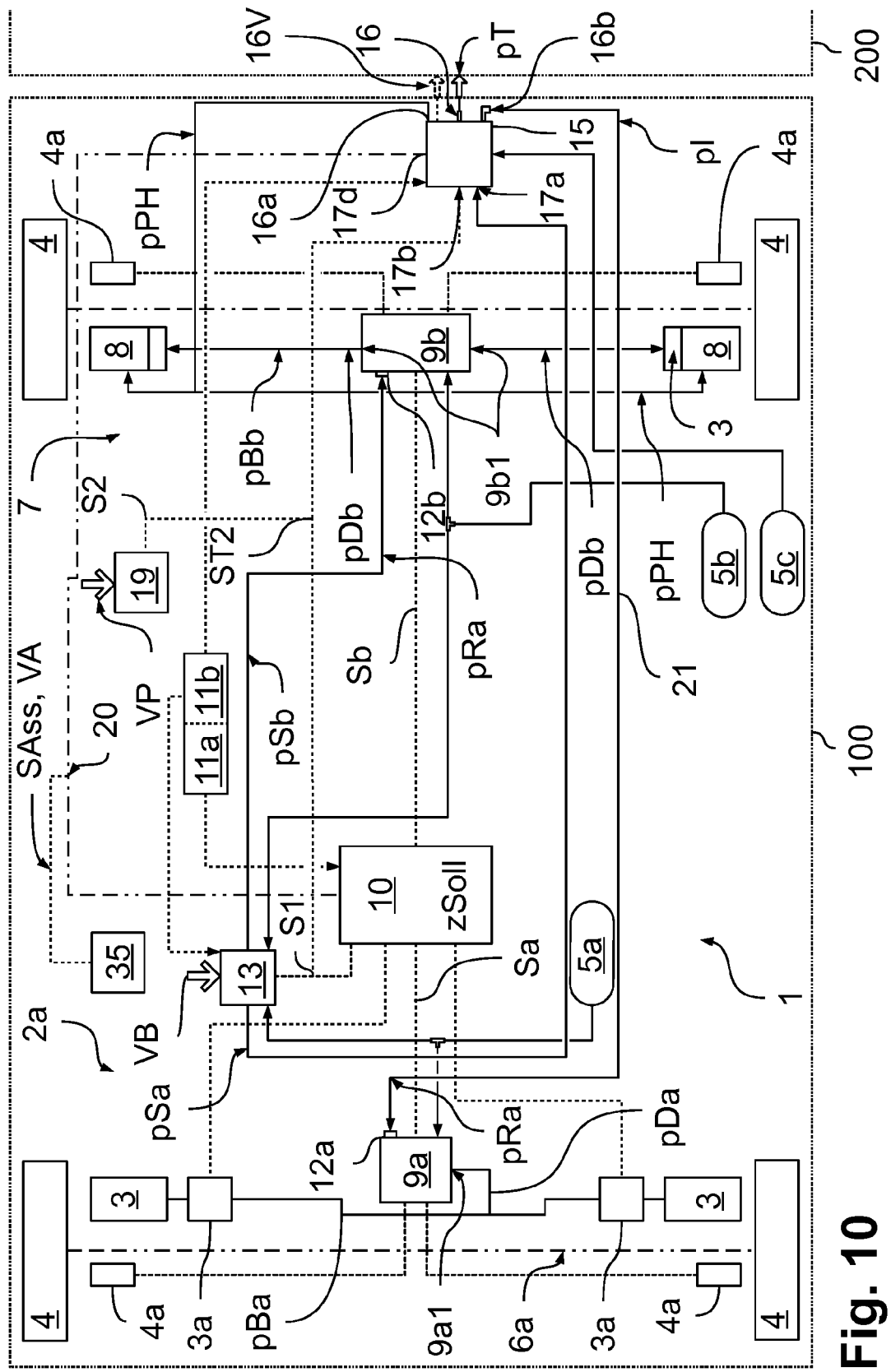

However, alternatively, the inverter control valve 15 can, according to FIG. 8c, also be used in a brake system 1 with an electronic parking brake and/or an electropneumatic service brake valve 13 as illustrated in FIG. 10, wherein the parking-brake activation signal S2 or the parking-brake braking specification VP is then also output electronically to the second inverter input 17b via the second inverter control signal ST2 in order to generate the inverter control pressure pl in the inverter control valve 15, in this case via the parking-brake control module 18 which is integrated into the inverter control valve 15, and to transmit said inverter control pressure pl to the inverter switching valve 14c which is arranged in the inverter control valve 15. The trailer control pressure pT can be output to the trailer 200 via the inverter output 16, the parking-brake brake pressure pPH can be output to the spring-loaded brakes 8 via the parking brake output 16a, and either the inverter control pressure pl, which is inversely proportional to the parking-brake brake pressure pPH, can be output via the redundancy output 16b, or the service-brake control pressure pSa, pSb can be output via the redundancy pressure line 21.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Brake system
2a Front-axle service brake circuit
2b Rear-axle service brake circuit
3 Service brakes
3a ABS control valves
4 Wheels
4a Wheel speed sensors
5a Front-axle pressure medium reservoir
5b Rear-axle pressure medium reservoir
5c Parking-brake pressure medium reservoir
6a Front axle
6b Rear axle
7 Parking brake circuit
8 Spring-loaded brakes
9a Front-axle pressure modulator
9a1 Front-axle pressure-modulator output
9b Rear-axle pressure modulator
9b1 Rear-axle pressure-modulator output
10 Service-brake control module
11a First energy source
11b Second energy source
12a Pneumatic front-axle redundancy port
12b Pneumatic rear-axle redundancy port
13 Service brake valve
13 Electronic service-brake activation device
14a Front-axle switching valve
14a1 First front-axle switching-valve input
14a2 Second front-axle switching-valve input
14a3 Front-axle switching-valve output
14b Rear-axle switching valve
14b1 First rear-axle switching-valve input
14b2 Second rear-axle switching-valve input
14b3 Rear-axle switching-valve output
15 Inverter valve
15a Trailer control valve
16 Inverter output
16a Parking brake output
16V Reservoir pressure output
17a First inverter input
17b Second inverter input
17c Third inverter input
17d Fourth inverter input
18 Parking-brake control module
19 Parking-brake activation device
20 CAN bus
21 Redundancy pressure line
22 Shutoff valve
23 Bleeding port
24 Parking brake valve
25 Relay valve
26 Inverse relay valve
28 Inverter control module
29 Pilot control module
31 Pressure
35 Assistance control module
40a Shuttle valve
40b 3/2-way valve
100 Vehicle
200 Trailer
pBa Front-axle brake pressure
pBb Rear-axle brake pressure
pDa Front-axle pressure-modulator output pressure
pDb Rear-axle pressure-modulator output pressure
pI Inverter control pressure
pPH Parking-brake control pressure
pRa Front-axle redundancy pressure
pRb Rear-axle redundancy pressure
pSa Front-axle service-brake control pressure
pSb Rear-axle service-brake control pressure
pSPH Parking-brake control pressure
pSU Switching control pressure
pT Trailer control pressure
S1 Service-brake activation signal
S2 Parking-brake activation signal
S3 Braking request signal
SAss Assistance control signal
Sa Front-axle service-brake control signal
Sb Rear-axle service-brake control signal
SD Diagnostic signal
ST1 First inverter control signal
SU Switching signal
SZ Shutoff signal
VA Assistance braking specification
VB Service-brake braking specification
VP Parking-brake braking specification
X1 First switching-valve switched position
X2 Second switching-valve switched position
Z1 First shutoff-valve switched position
Z2 Second shutoff-valve switched position
zSoll Vehicle setpoint deceleration

The invention claimed is:
1. An electronically controllable brake system for a vehicle, the electronically controllable brake system comprising:
at least one service brake circuit with service brakes and a service brake control module, wherein a service-brake brake pressure can be fed to the service brakes, and the service-brake control module is designed to generate a service-brake control signal as a function of a braking specification, wherein the service-brake brake pressure can be generated as a function of the service-brake control signal and specified to the service brakes, for the implementation of the braking specification via the at least one service brake circuit, under electrical control by the service-brake control module,
a parking brake circuit with spring-loaded brakes, wherein a parking-brake brake pressure can be fed to the spring-loaded brakes, wherein the parking-brake brake pressure can be generated as a function of the braking specification and specified to the spring-loaded brakes, in order to implement the braking specification via the parking brake circuit,
- an inverter control valve with an inverter output and/or a redundancy output, wherein the inverter control valve is designed to generate an inverter control pressure and to output it via the inverter output and/or the redundancy output, wherein the inverter control pressure is inversely proportional to the parking-brake brake pressure and/or a parking-brake control pressure which specifies the parking-brake brake pressure, which parking-brake brake pressure and parking-brake control pressure are to be applied in order to implement the braking specification in the parking brake circuit via the spring-loaded brakes,
- wherein the service-brake brake pressure can be applied to the service brakes of the at least one service brake circuit as a function of the inverter control pressure predefined by the inverter control valve, if implementation of the braking specification via the at least one service brake circuit and the electrical control of service-brake control module is prevented.

2. The electronically controlled brake system as claimed in claim 1, wherein the braking specification is an assistance braking specification which is specified in an automated fashion by an assistance control module and/or a parking-brake braking specification which is specified manually via a parking-brake activation device or via a parking brake valve and/or is a service-brake braking specification which can be specified manually via an electropneumatic service brake valve or an electric service-brake activation device.

3. The electronically controllable brake system as claimed in claim 2, wherein a parking-brake control module for outputting the parking-brake brake pressure as a function of the braking specification specified to the parking brake circuit is arranged in the parking brake circuit.

4. The electronically controllable brake system as claimed in claim 3, wherein:
- the parking-brake control module is connected to the spring-loaded brakes of the parking brake circuit in order to pneumatically transmit the parking-brake brake pressure to the spring-loaded brakes, and/or
- the parking-brake control module is connected to the inverter control valve in order to pneumatically transmit the parking-brake brake pressure or a pressure dependent thereon which is generated in the parking-brake control module to the inverter control valve.

5. The electronically controllable brake system as claimed in claim 3, wherein the parking-brake control module is integrated into the inverter control valve, and the braking specification can be transmitted electrically to the inverter control valve, wherein the inverter control valve is configured to (i) generate the parking-brake brake pressure via the parking brake control module on the basis of the braking specification and to apply it to the spring-loaded brakes in the parking brake circuit via a parking brake output, and (ii) generate the inverter control pressure via an inverter control module and a pilot control module on the basis of the braking specification and to output it to the inverter output and/or the redundancy output,
- wherein the parking-brake brake pressure which is output via the parking brake output is inversely proportional to the inverter control pressure which is output via the inverter output and/or the redundancy output.

6. The electronically controllable brake system as claimed in claim 3, wherein the parking brake valve is designed to generate an output the parking-brake control pressure as a function of the parking-brake braking specification which is manually specified via the parking brake valve.

7. The electronically controllable brake system as claimed in claim 6, wherein:
- the parking brake valve is connected to a relay valve, and the relay valve is designed to generate the parking-brake brake pressure from the parking-brake control pressure, and the relay valve is connected to the spring-loaded brakes of the parking brake circuit in order to pneumatically transmit the parking-brake brake pressure, applied by the relay valve, to the spring-loaded brakes, and/or
- the parking brake valve is connected to the inverter control valve in order to pneumatically transmit the parking-brake control pressure or a pressure dependent thereon to the inverter control valve.

8. The electronically controllable brake system as claimed in claim 3, wherein an inverse relay valve is arranged in the inverter control valve in order to invert the parking-brake brake pressure which is pneumatically transmitted to the inverter control valve by the parking-brake control module and/or in order to invert the parking-brake control pressure which is pneumatically transmitted by the parking brake valve or to invert a pressure which is generated as a function thereof in order to generate an inverter control pressure which is inversely proportional to the parking-brake brake pressure and/or the parking-brake control pressure.

9. The electronically controllable brake system as claimed in claim 8, wherein the inverter control valve is embodied as a trailer control valve, wherein the trailer control valve is designed to generate a trailer control pressure which is dependent on the parking-brake brake pressure and/or on the parking-brake control pressure and to transmit it to a trailer via the inverter output, wherein the trailer control pressure is inversely proportional to the parking-brake brake pressure and/or to the parking-brake control pressure, and the trailer control pressure corresponds to the inverter control pressure.

10. The electronically controllable brake system as claimed in claim 1, wherein a pressure modulator is arranged in the at least one service brake circuit, wherein the pressure modulator has a pressure modulator output, and the pressure modulator is designed to generate a pressure-modulator output pressure as a function of the service-brake control signal and to output it via the pressure modulator output, wherein the pressure-modulator output pressure can be transmitted as a service-brake brake pressure to the service brakes of the at least one service brake circuit.

11. The electronically controllable brake system as claimed in claim 10, wherein the pressure modulator has a pneumatic redundancy port, and optionally for the pneumatic redundancy port the inverter control pressure or a service-brake control pressure, applied by an electropneumatic service brake valve on the basis of a service-brake braking specification, can be specified as a redundancy pressure, wherein for this purpose a switching valve is connected upstream of the respective redundancy port, wherein the switching valve can be placed in two switching-valve switched positions, and
- in a first switching-valve switched position the switching valve can output the service-brake control pressure which is applied by the service brake valve on the basis of the service-brake braking specification, and
- in a second switching-valve switched position the switching valve can output the inverter control pressure which is generated in the inverter control valve, as a redundancy pressure, to the redundancy port, in order to redundantly actuate the pressure modulator.

12. The electronically controllable brake system as claimed in claim 11, wherein the switching valve is arranged in the at least one service brake circuit, preferably on a vehicle axle which is assigned to the at least one service brake circuit, and
   in the first switching-valve switched position the switching valve connects the service brake valve to the redundancy port in order to specify the service-brake control pressure as a redundancy pressure to the redundancy port, and
   in the second switching-valve switched position the switching valve connects the inverter output of the inverter control valve to the redundancy port, in order to specify the inverter control pressure as a redundancy pressure to the redundancy port.

13. The electronically controllable brake system as claimed in claim 11, wherein an inverter switching valve is arranged as a switching valve in or on the inverter control valve, and
   in the first switching-valve switched position the inverter switching valve connects the service brake valve to the redundancy output of the inverter control valve, and
   in the second switching-valve switched position the inverter switching valve outputs the inverter control pressure, which is generated in the inverter control valve, to the redundancy output,
   wherein the redundancy output of the inverter control valve is connected to the redundancy port of the pressure modulator.

14. The electronically controllable brake system as claimed in claim 11, wherein, if a specification of the service-brake brake pressure is prevented as a function of the service-brake control signal, the pressure modulator is designed to generate the pressure-modulator output pressure as a function of the service-brake control pressure, which is optionally fed to the redundancy port, or as a function of the inverter control pressure, in order to redundantly specify the service-brake brake pressure.

15. The electronically controllable brake system as claimed in claim 11, wherein the switching valve is embodied as a shuttle valve or an electrically or pneumatically controllable 3/2-way valve,
   wherein the shuttle valve is designed to set the first or the second switching valve-switched position optionally as a function of whether the inverter control pressure or the service-brake control pressure or the pressure-modulator output pressure is higher, wherein the first switching-valve switched position is set if the service-brake control pressure or the pressure-modulator output pressure is higher, and the 3/2-way valve can be switched into the first switching-valve switched position or into the second switching-valve switched position as a function of an electrically specified switching signal or a pneumatically specified switching control pressure, wherein the switching signal or the switching control pressure can be generated as a function of whether a requested service-brake braking specification is present in the at least one service brake circuit.

16. The electronically controllable brake system as claimed in claim 10, wherein either the pressure-modulator output pressure or the inverter control pressure can be predefined as a service-brake brake pressure to the service brakes in the at least one service brake circuit, wherein for this purpose a switching valve is connected upstream of the service brakes, wherein the switching valve can be placed in two switching-valve switched positions, and
   in a first switching-valve switched position the switching valve can apply the pressure-modulator output pressure, and
   in a second switching-valve switched position the switching valve can apply the inverter control pressure, which is generated in the inverter control valve, as a service-brake brake pressure to the service brakes, in order to redundantly actuate the service brakes.

17. The electronically controllable brake system as claimed in claim 16, wherein the switching valve is arranged in the at least one service brake circuit, preferably on a vehicle axle which is assigned to the at least one service brake circuit, and
   in a first switching-valve switched position the switching valve connects the pressure modulator output to the service brakes in order to specify the pressure-modulator output pressure as a service-brake brake pressure to the service brakes, and
   in a second switching-valve switched position the switching valve connects the inverter output of the inverter control valve to the service brakes in order to specify the inverter control pressure as a service-brake brake pressure to the service brakes.

18. The electronically controllable brake system as claimed in claim 16, wherein an inverter switching valve is arranged as a switching valve in or on the inverter control valve, and
   in the first switching-valve switched position the inverter switching valve connects the pressure modulator output to the redundancy output of the inverter control valve, and
   in the second switching-valve switched position the inverter switching valve outputs the inverter control pressure, which is generated in the inverter control valve, to the redundancy output,
   wherein the redundancy output of the inverter control valve is connected to the service brakes.

19. The electronically controllable brake system as claimed in claim 1, wherein furthermore a shutoff valve is provided in the brake system, wherein in a first shutoff-valve switched position the shutoff valve prevents application of the service-brake braking pressure to the service brakes as a function of the inverter control pressure which is generated in the inverter control valve, and in a second shutoff-valve switched position the shutoff valve permits the regulation as a function in order to redundantly implement the braking specification via the at least one service brake circuit, wherein in the first shutoff-valve switched position the shutoff valve is designed to bleed the service brakes and/or a redundancy pressure line running between the inverter output or the redundancy output of the inverter control valve and the at least one service brake circuit.

20. The electronically controllable brake system as claimed in claim 19, wherein the shutoff valve is integrated into the inverter control valve or is arranged in the redundancy pressure line, connected downstream of the inverter output or the redundancy output.

21. The electronically controllable brake system as claimed in claim 19, wherein the switching valve forms the shutoff valve, wherein in the first the switching-valve switched position the switching valve is designed to bleed the service brakes and/or the redundancy pressure line.

22. The electronically controllable brake system as claimed in claim 1, wherein the at least one service brake circuit is supplied with energy by a first energy source and the parking brake circuit and/or the inverter control valve is supplied with energy by a second energy source, wherein the first energy source is independent of the second energy source.

23. The electronically controllable brake system as claimed in claim 1, wherein the brake system is connected to a CAN bus of the vehicle, and the braking specification can be transmitted via the CAN bus to the at least one service brake circuit and/or the parking brake circuit and/or the inverter control valve of the brake system.

24. A vehicle, in particular utility vehicle, having an electronically controllable brake system as claimed in claim 1.

25. A method for controlling an electronic brake system, the method comprising:

detecting whether a braking specification can be implemented via at least one service brake circuit and under electrical control by a service-brake control module;

generating an inverter control pressure in an inverter control valve as a function of a braking specification which is specified to a parking brake circuit; and generating a service-brake brake pressure in the at least one service brake circuit as a function of the inverter control pressure which is generated in the inverter control valve, if implementation of the braking specification via the at least one service brake circuit under electrical control by the service-brake control module is prevented.

26. The method as claimed in claim 25, wherein the inverter control pressure in the inverter control valve is generated as a function of the parking-brake brake pressure which is generated in the parking brake circuit on the basis of the braking specification, or the parking-brake control pressure, wherein for this purpose an inverter control pressure which is inversely proportional to the parking-brake brake pressure or the parking-brake control pressure is generated in the inverter control valve in order to redundantly actuate the respective service brake circuit with the inverter control pressure.

27. The method as claimed in claim 25, wherein, in order to specify the service-brake brake pressure to the service brake system as a function of the inverter control pressure which is generated by the inverter control valve, this inverter control pressure is fed to the service brakes directly as a service-brake brake pressure or to the redundancy port of a pressure modulator as a redundancy pressure, and the service-brake brake pressure is generated and applied in the pressure modulator as a function thereof if implementation of the braking specification under electrical control by the service-brake control module, via the at least one service brake circuit, is prevented.

\* \* \* \* \*